United States Patent
Chen et al.

(10) Patent No.: US 12,149,450 B2
(45) Date of Patent: Nov. 19, 2024

(54) MODEL TRAINING-BASED COMMUNICATION METHOD AND APPARATUS, AND SYSTEM

(71) Applicant: Huawei Technologies Co., Ltd., Guangdong (CN)

(72) Inventors: Chen Chen, Shenzhen (CN); Sen Wang, Hong Kong (CN); Gong Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 202 days.

(21) Appl. No.: 17/814,073

(22) Filed: Jul. 21, 2022

(65) Prior Publication Data

US 2022/0360539 A1 Nov. 10, 2022

Related U.S. Application Data

(63) Continuation of application No. PCT/CN2020/140434, filed on Dec. 28, 2020.

(30) Foreign Application Priority Data

Jan. 23, 2020 (CN) .......................... 202010077048.8

(51) Int. Cl.
  *G06F 15/177* (2006.01)
  *H04L 41/082* (2022.01)
  (Continued)

(52) U.S. Cl.
  CPC ............ *H04L 47/28* (2013.01); *H04L 41/082* (2013.01); *H04L 41/16* (2013.01)

(58) Field of Classification Search
  CPC ........ H04L 47/28; H04L 41/082; H04L 41/16
  See application file for complete search history.

(56) References Cited

U.S. PATENT DOCUMENTS 11,869,662 B2 * 1/2024 Gil Ramos ............ G16H 50/70
11,916,764 B1 * 2/2024 Nagaraju .............. H04L 43/028
(Continued)

FOREIGN PATENT DOCUMENTS

| CN | 108287763 A | 7/2018 |
|---|---|---|
| CN | 109117953 A | 1/2019 |

(Continued)

OTHER PUBLICATIONS

Li-Yung Ho et al, Adaptive Communication for Distributed Deep Learning on Commodity GPU Cluster, 2018 18th EEE/ACM International Symposium on Cluster, Cloud and Grid Computing, 8 pages.

(Continued)

*Primary Examiner* — Duyen M Doan
(74) *Attorney, Agent, or Firm* — WOMBLE BOND DICKINSON (US) LLP

(57) ABSTRACT

This application provides a model training-based communication method and apparatus, and a system, to effectively decrease a data amount of a parameter transmitted between the communication device and the central server. The method includes: The communication device determines a change amount of a first model parameter value. If the communication device determines, based on the change amount of the first model parameter value, that a first model parameter is stable, the communication device stops sending an update amount of the first model parameter value to the central server in a preset time period. The update amount of the first model parameter value is determined by the communication device based on user data in a process of performing model training. The communication device receives a second model parameter value sent by the central server.

20 Claims, 10 Drawing Sheets

(51) Int. Cl.
*H04L 41/16* (2022.01)
*H04L 47/28* (2022.01)

(56) References Cited

U.S. PATENT DOCUMENTS

| | | | |
|---|---|---|---|
| 2015/0242760 A1* | 8/2015 | Miao | G06N 20/00 |
| | | | 706/12 |
| 2017/0185898 A1* | 6/2017 | Paul | G06N 20/00 |
| 2018/0268282 A1 | 9/2018 | Zanpure | |
| 2018/0268290 A1 | 9/2018 | Bose et al. | |
| 2020/0027033 A1* | 1/2020 | Garg | G06F 17/18 |
| 2020/0334524 A1* | 10/2020 | Sprague | H04L 67/12 |
| 2023/0065937 A1* | 3/2023 | Satheesh Kumar | G06N 20/00 |

FOREIGN PATENT DOCUMENTS

| | | |
|---|---|---|
| EP | 3229152 A1 | 10/2017 |
| RU | 2702980 C1 | 10/2019 |

OTHER PUBLICATIONS

Jakub Konecny, H Brendan McMahan, Felix X Yu, Peter Richtŕik, Ananda Theertha Suresh, and Dave Bacon. Federated learning: Strategies for improving communication efficiency. arXiv preprint arXiv:1610.05492, 2016, 5 pages.

Luping Wang et al, CMFL: Mitigating Communication Overhead for Federated Learning, 2019 IEEE 39th International Conference on Distributed Computing Systems (ICDCS), 11 pages.

H Brendan McMahan, Eider Moore, Daniel Ramage, Seth Hampson, et al. Communication-efficient learning of deep networks from decentralized data. arXiv preprint arXiv:1602.05629, 2016, 10 pages.

Zeyi Tao et al., eSGD: Communication Efficient Distributed Deep Learning on the Edge, In Irfan Ahmad, Swaminathan Sundararaman, editors, USENIX Workshop on Hot Topics in Edge Computing, HotEdge 2018, Boston, MA, Jul. 10, 2018. USENIX Association, 2018, 6 pages.

Malewicz, Grzegorz, Matthew H. Austern, Aart JC Bik, James C. Dehnert, Ilan Horn, Naty Leiser, and Grzegorz Czajkowski. Pregel: a system for large-scale graph processing. In Proceedings of the 2010 ACM SIGMOD International Conference on Management of data, pp. 135-146, 2010.

Kevin Hsieh et al., Gaia: Geo-Distributed Machine Learning Approaching LAN Speeds, 14th USENIX Symposium on Networked Systems Design and Implementation, 19 pages.

Kevin Hsieh, Aaron Harlap, Nandita Vijaykumar, Dimitris Konomis, Gregory R Ganger, Phillip B Gibbons, and Onur Mutlu. Gaia: Geo-distributed machine learning approaching LAN speeds. In 14th USENIX Symposium on Networked Systems Design and Implementation (NSDI), pp. 629 647, 2017.

R. Chen, J. Shi, Y. Chen, and H. Chen. Powerlyra: Differentiated graph computation and partitioning on skewed graphs. In Proceedings of the Tenth European Conference on Computer Systems (EuroSys), pp. 1-15, 2015.

\* cited by examiner

MODEL TRAINING-BASED COMMUNICATION METHOD AND APPARATUS, AND SYSTEM

CROSS-REFERENCE TO RELATED APPLICATIONS

This application is a continuation of International Application No. PCT/CN2020/140434, filed on Dec. 28, 2020, which application claims priority to Chinese Patent Application No. 202010077048.8, filed on Jan. 23, 2020. The disclosures of the aforementioned applications are hereby incorporated by reference in their entireties.

TECHNICAL FIELD

This application relates to the field of communication technologies, and in particular, to a model training-based communication method and apparatus, and a system.

BACKGROUND

A federated learning (FL) system is a newly emerging basic technology for artificial intelligence. A main idea of the federated learning system is as follows: A central server cooperates with a plurality of communication devices, to construct a machine learning model based on datasets on the plurality of communication devices. In a process of constructing the machine learning model, the communication devices do not need to share data with each other, thereby preventing data leakage.

In the federated learning system, the central server sends a value of each parameter in the machine learning model to each communication device. Serving as a cooperated unit, each communication device locally trains a model, updates the value of each parameter in the machine learning model, and sends a gradient of the value of each parameter to the central server. The central server generates a new model parameter value based on the gradient of the value of each parameter. The foregoing operations are repeatedly performed until the machine learning model is converged, to complete the entire model training process.

As the machine learning model becomes larger, a data amount of a model parameter that needs to be transmitted between the communication device and the central server becomes larger. Due to problems such as a connection speed and a bandwidth that are of the Internet, a delay of model parameter transmission between the communication device and the central server is relatively long, and a rate for updating a model parameter value is relatively slow.

SUMMARY

A model training-based communication method and apparatus, and a system provided in this application can effectively decrease a data amount of a parameter transmitted between a communication device and a server, and improve communication efficiency without a loss of model training precision.

To achieve the foregoing objectives, the following technical solutions are used in this application.

According to a first aspect, this application provides a model training-based communication method, applied to a system including a central server and a communication device. The method may include: The communication device determines a change amount of a first model parameter value. If the communication device determines, based on the change amount of the first model parameter value, that a first model parameter is stable, the communication device stops sending an update amount of the first model parameter value to the central server in a preset time period. The update amount of the first model parameter value is determined by the communication device based on user data in a process of performing model training. The communication device receives a second model parameter value sent by the central server. In the preset time period, the second model parameter value does not include the first model parameter value.

The first model parameter is a model parameter participating in determining whether a model parameter is stable, a quantity of first model parameters is not limited, and the first model parameter may be any one or more model parameters. If it is determined that the first model parameter is stable, the first model parameter is a model parameter that does not participate in transmission of an update amount and a value in the preset time period. A second model parameter is a model parameter that participates in transmission of an update amount and a value between the central server and the communication device. A quantity of second model parameters is also not limited, and there may be one or more second model parameters. Optionally, all first model parameters and all second model parameters form all model parameters.

The change amount of the first model parameter value is used to determine whether the first model parameter is stable. If the first model parameter is stable, it indicates that the first model parameter is converged. In a subsequent communication process, the change amount of the value of the first model parameter mainly fluctuates at a small amplitude and has little significance for model training. Therefore, the preset time period may be set, and transmission of an update amount of a stable first model parameter value stops in the preset time period. It may be understood that if the communication device does not send the update amount of the first model parameter value to the central server in the preset time period, the central server does not generate and send an updated value of the first model parameter to the communication device in the preset time period, to decrease an amount of bidirectional data between the communication device and the central server.

After receiving an updated model parameter value sent by the central server, the communication device may construct an updated local training model and train the model by using local user data. In a training process, the communication device adjusts the model parameter value based on the user data, to obtain an update amount of the model parameter value, that is, a gradient of the model parameter value.

In this way, after the communication device determines, based on a change amount of a model parameter value, that a model parameter is stable, the communication device may stop transmitting an update amount of the model parameter value in the preset time period, thereby effectively decreasing a data amount of a model parameter transmitted between the communication device and the server, and improving communication efficiency without a loss of model training precision.

In an embodiment, the method further includes: After the preset time period, the communication device sends the update amount of the first model parameter value to the central server and receives the first model parameter value sent by the central server.

In other words, after the preset time period, the first model parameter whose transmission stops automatically starts to participate in transmission. To be specific, the communication device may adaptively adjust, based on a change amount of a model parameter value, an amount of data transmitted between the communication device and the central server.

In an embodiment, a model parameter value and an update amount of the value are transmitted between the communication device and the central server by using a packet.

In one design of the packet, that the communication device stops sending an update amount of the first model parameter value to the central server in a preset time period includes: The communication device sends a packet to the central server, where the packet includes an update amount of a third model parameter value and a value of a corresponding identification bit, and the update amount of the third model parameter value includes an update amount of the second model parameter value and the update amount of the first model parameter value. In the preset time period, a value of an identification bit corresponding to the update amount of the first model parameter value indicates that the communication device does not transmit the update amount of the first model parameter value to the central server.

For example, an identification bit included in the packet may include bit mapping, and each bit corresponds to data of a model parameter. For example, a value of the identification bit may be set to 0/1 for distinguishing and the like.

In this way, after receiving the packet sent by the communication device, the central server may determine, based on a value that is of each identification bit corresponding to an update amount of a model parameter value and that is carried in the packet, whether the update amount of the model parameter value corresponding to the identification bit is transmitted, to quickly read a transmitted update amount of a model parameter value; and may also quickly determine the update amount that is of the first model parameter value and whose transmission stops, and does not include, in data returned to the communication device, the updated value of the first model parameter.

In another design of the packet, the communication device sends a packet to the central server, where the packet includes the update amount of the second model parameter value and a value of a corresponding identification bit. In the preset time period, the update amount of the second model parameter value does not include the update amount of the first model parameter value, and the value of the identification bit corresponding to the second model parameter indicates that the communication device transmits the update amount of the second model parameter value to the central server.

In this way, the packet includes only the update amount of the second model parameter value and the identification bit corresponding to the update amount. Therefore, the central server may directly determine the transmitted update amount of the second model parameter value based on the received packet, and subsequently directly return an updated value of the second model parameter, to further decrease an amount of transmitted data and accelerate a model training process.

In an embodiment, the packet directly does not include the update amount of the first model parameter value. A transmission sequence of the update amount of the third model parameter value in a packet that needs to be transmitted is preset between the communication device and the central server. Then, after determining that the first model parameter is stable, the communication device directly does not include, in the packet transmitted to the central server, the update amount of the first model parameter value. The central server may also determine, based on a vacant bit, a specific first model parameter value whose update amount stops to be transmitted, and may also learn of a specific second model parameter value whose update amount corresponds to transmitted data.

In an embodiment, that the communication device determines a change amount of a first model parameter value includes: The communication device obtains the change amount of the first model parameter value based on historical information of the first model parameter value. For example, the communication device obtains a historical value of the first model parameter or a change amount of the historical value, and may further calculate a current change amount of the first model parameter value with reference to the current first model parameter value.

In an embodiment, the historical information of the value includes an effective change amount of the first model parameter value and an accumulated change amount of the first model parameter value.

A current effective change amount and accumulated change amount of the first model parameter value may be obtained based on obtained effective change amounts and accumulated change amounts of all first model parameter values; or may be obtained based on effective change amounts and accumulated change amounts of the first model parameter value that are obtained in recent several times of detection; or may be obtained based on an effective change amount and an accumulated change amount of the first model parameter value that are obtained in last detection. Then, the change amount of the first model parameter value may be obtained based on a ratio of the effective change amount of the first model parameter value to the accumulated change amount.

For example, an exponential moving average (EMA) method may be used to obtain a current effective change amount and accumulated change amount of the first model parameter value based on the effective change amount of the first model parameter value and the accumulated change amount of the first model parameter value that are obtained in last detection, and first model parameter values obtained in last detection and current detection, to obtain the change amount of the first model parameter value. In addition, when the EMA method is used to obtain the change amount of the first model parameter value, only the effective change amount and the accumulated change amount of the first model parameter value that are obtained last time and the first model parameter value obtained last time need to be stored, thereby effectively reducing occupied storage space.

In an embodiment, that the communication device determines, based on the change amount of the first model parameter value, that a first model parameter is stable includes: if the change amount of the first model parameter value is less than a preset threshold, determining that the first model parameter is stable.

For example, the preset threshold may be determined based on experimental data, an expert experience value, and the like. If the change amount of the first model parameter value is less than the preset threshold, it indicates that the first model parameter is currently converged and stable, and continuous transmission of the first model parameter generates no relatively great contribution to model training, so that transmission of the update amount of the first model parameter value may stop.

In an embodiment, that the communication device determines a change amount of a first model parameter value includes: The communication device determines the change amount of the first model parameter value M times, where M is a positive integer greater than or equal to 2. That the communication device determines, based on a stable status of the first model parameter at the $k^{th}$ time, a preset condition met by the preset time period includes: If it is determined, at the $k^{th}$ time based on the change amount of the first model parameter value, that the first model parameter is stable, duration of the preset time period is first duration, where the first duration is greater than second duration. The second duration is duration of a preset time period in which the communication device stops sending the update amount of the first model parameter value to the central server when determining at the $(k-1)^{th}$ time that the first model parameter is stable; or the second duration is duration that is obtained when it is determined at the $(k-1)^{th}$ time that the first model parameter is unstable, and that is used to adjust duration of a corresponding preset time period when the first model parameter is stable next time, where k is a positive integer, and k≤M.

In an embodiment, the preset condition further includes: If it is determined at the $k^{th}$ time that the first model parameter is unstable, third duration used to adjust duration of a corresponding preset time period when the first model parameter is stable next time is obtained, where the third duration is less than fourth duration. The fourth duration is duration of a preset time period in which the communication device stops sending the update amount of the first model parameter value to the central server when determining at the $(k-1)^{th}$ time that the first model parameter is stable; or the fourth duration is duration that is obtained when it is determined at the $(k-1)^{th}$ time that the first model parameter is unstable, and that is used to adjust duration of a corresponding preset time period when the first model parameter is stable next time.

To be specific, in a process of transmitting an update amount or a value of a model parameter between the communication device and the central server, duration is obtained each time the change amount of the first model parameter value is determined and detected. If it is determined this time that the first model parameter is stable, it indicates that the first model parameter is converged, and duration in which transmission of the first model parameter stops needs to be prolonged. In this case, obtained duration is duration of the preset time period, and the duration is greater than duration obtained in last detection. Alternatively, if it is determined this time that the first model parameter is unstable, it indicates that the first model parameter is not converged, and duration in which transmission of the first model parameter stops next time needs to be shortened. In this case, obtained duration is duration used to adjust duration obtained in next detection, and the duration is less than duration obtained in last detection.

In this way, the duration of the preset time period in which transmission stops may be dynamically adjusted based on a stable status of the first model parameter, to flexibly control a quantity of model parameters participating in model training that are transmitted between the communication device and the central server, thereby ensuring that precision of a finally obtained model meets a requirement.

In an embodiment, that if the communication device determines, based on the change amount of the first model parameter value, that a first model parameter is stable, the communication device stops sending an update amount of the first model parameter value to the central server in a preset time period includes: If the communication device determines, at the $k^{th}$ time based on the change amount of the first model parameter value, that the first model parameter is stable, the communication device stops sending the update amount of the first model parameter value to the central server in n sending periods, where n is a positive integer.

After the n sending periods, if the communication device determines, at the $(k+1)^{th}$ time based on the change amount of the first model parameter value, that the first model parameter is stable, the communication device stops sending the update amount of the first model parameter value to the central server in (n+m) sending periods, where m is a positive integer. Alternatively, after the n sending periods, if the communication device determines, at the $(k+1)^{th}$ time based on the change amount of the first model parameter value, that the first model parameter is unstable, the communication device stops sending the update amount of the first model parameter value to the central server in (n/r+m) sending periods if the communication device determines, at the $(k+2)^{th}$ time based on the change amount, that the first model parameter is stable, where r is a positive integer greater than or equal to 2, and (n/r)≥1. The sending period is a period in which the communication device sends an update amount of a model parameter value to the central server.

In other words, the duration of the preset time period in which transmission of the update amount of the first model parameter value stops may be adjusted based on duration of the sending period. After it is determined that the first model parameter is stable, duration of an integer multiple of the sending period is added to duration obtained last time, to obtain a current preset time period in which transmission stops. Alternatively, after it is determined that the first model parameter is unstable, duration obtained last time is shortened by an equal proportion to obtain current duration.

For example, it is assumed that if the first model parameter is stable at the fifth time (the $k^{th}$ time) of detection, the obtained duration of the preset time period is duration of two sending periods.

If the first model parameter is stable at the sixth time (the $(k+1)^{th}$ time) of detection after the preset time period arrives, the duration of the preset time period may be duration of 2+1=3 sending periods.

If the first model parameter is unstable at the sixth time (the $(k+1)^{th}$ time) of detection after the preset time period arrives, the obtained duration may be duration of 2/2=1 sending period. If the first model parameter is stable at the seventh time (the $(k+2)^{th}$ time) of detection, the obtained duration of the preset time period may be duration of 2/2+1=2 sending periods.

In an embodiment, the method further includes: The communication device determines the change amount of the first model parameter value based on a detection period, where the sending period is less than the detection period.

Because it is meaningful for the communication device to determine a stable status of the first model parameter value only after the communication device sends the update amount of the first model parameter value and obtains an updated first model parameter value, the sending period needs to be less than the detection period.

In an embodiment, the method further includes: decreasing, by the communication device, a value of the preset threshold if the communication device determines that a proportion of a quantity of stable first model parameters to a quantity of third model parameters is greater than a preset proportion.

In other words, after a quantity of model parameters whose transmission stops reaches a specific proportion, a threshold for determining whether a model parameter is stable needs to be decreased, to decrease the quantity of model parameters whose transmission stops, and ensure a quantity of model parameters with updated values in model parameters participating in model training.

In this way, the preset threshold is dynamically adjusted, to prevent an excessively large quantity of model parameters whose transmission stops from prolonging a model training process or affecting final model precision. For example, after transmission of a large quantity of model parameters stops, the model can be trained in the preset time period by using only unchanged values of the model parameters whose transmission stops, and a training effect may not be ideal. Updated values of the model parameters whose transmission stops can be obtained only after duration of preset time periods of these model parameters arrives, to continue to train the model, which causes excessively long training time for the model to meet a model convergence condition.

In an embodiment, before the communication device determines the change amount of the first model parameter value, the method further includes: The communication device receives the second model parameter value sent by the central server. For example, the sending period is 5 s, and the detection period is 10 s. In this case, the communication device sends the update amount of the first model parameter value to the central server every 5 s, and similarly, the central server sends the first model parameter value to the communication device every 5 s. However, the communication device determines the change amount of the first model parameter value every 10 s, and determines, based on the change amount, whether the first model parameter is stable.

According to a second aspect, this application provides a model training-based communication method, applied to a system including a central server and a communication device. The method includes: The central server receives an update amount that is of a second model parameter value and that is sent by the communication device, where in a preset time period, the update amount of the second model parameter value does not include an update amount of a first model parameter value; and a first model parameter is a stable model parameter determined based on a change amount of the first model parameter value. The central server determines an updated value of a second model parameter based on the update amount of the second model parameter value. The central server sends the updated value of the second model parameter to the communication device, where in the preset time period, the updated value of the second model parameter does not include an updated value of the first model parameter.

The update amount of the first model parameter value and the update amount of the second model parameter are determined by the communication device based on user data in a process of performing model training. To be specific, the communication device determines an update amount of a model parameter value based on the user data in the process of performing model training. In addition, the communication device determines, based on a stable status of a model parameter, an update amount of a value of a model parameter that needs to stop transmitting to the central server.

To be specific, the central server determines, based on the received update amount of the model parameter value, whether the communication device stops transmitting some model parameters. If the communication device stops transmitting some model parameters, the central server also stops transmitting, in the preset time period, the model parameters that the communication device stops to transmit, to implement a bidirectional decrease in an amount of transmitted data, thereby improving communication efficiency.

In an embodiment, the method further includes: After the preset time period, the central server sends the first model parameter value to the communication device and receives the update amount that is of the first model parameter value and that is sent by the communication device.

After the preset time period, the communication device automatically starts to send an update amount of a model parameter value to the central server, and then the central server determines an updated value of a model parameter based on the update amount of the model parameter value, so that after the preset time period, the central server transmits, to the communication device, an updated value of a model parameter whose transmission stops previously. In this way, bidirectional adaptive adjustment of an amount of communicated data is implemented between the central server and the communication device.

In an embodiment, that the central server sends the updated value of the second model parameter to the communication device, where in the preset time period, the updated value of the second model parameter does not include an updated value of the first model parameter includes: The central server sends a packet to the communication device, where the packet includes an updated value of a third model parameter and a value of a corresponding identification bit, and the updated value of the third model parameter includes the updated value of the second model parameter and the updated value of the first model parameter. In the preset time period, a value of an identification bit corresponding to the updated value of the first model parameter indicates that the central server does not transmit the updated value of the first model parameter to the communication device. Alternatively, the central server sends a packet to the communication device, where the packet includes the updated value of the second model parameter and a value of a corresponding identification bit. In the preset time period, the updated value of the second model parameter does not include the updated value of the first model parameter, and the value of the identification bit corresponding to the updated value of the second model parameter indicates that the central server transmits the updated value of the second model parameter to the communication device.

In an embodiment, that the first model parameter is a stable model parameter determined based on a change amount of the first model parameter value includes: if the change amount of the first model parameter value is less than a preset threshold, determining that the first model parameter is stable.

In an embodiment, before the central server receives the update amount that is of the second model parameter value and that is sent by the communication device, the method further includes: The central server sends the second model parameter value to the communication device.

In other words, a process of transmitting a model parameter between the central server and the communication device is a cyclic interaction process. The central server needs to send a model parameter value to the communication device, and then the communication device can obtain an update amount of the model parameter value based on the model parameter value, so that the central server can obtain the update amount of the model parameter value.

According to a third aspect, this application provides a model training-based communication apparatus. The apparatus includes a processing unit, a sending unit, and a receiving unit. The processing unit is configured to determine a change amount of a first model parameter value. The processing unit is further configured to determine, based on the change amount of the first model parameter value, whether a first model parameter is stable. The sending unit is configured to send an update amount of the first model parameter value to a central server. If the processing unit determines, based on the change amount of the first model parameter value, that the first model parameter is stable, the sending unit stops sending the update amount of the first model parameter value to the central server in a preset time period. The update amount of the first model parameter value is determined by the processing unit based on user data in a process of performing model training. The receiving unit is configured to receive a second model parameter value sent by the central server, where in the preset time period, the second model parameter value does not include the first model parameter value.

In an embodiment, the sending unit is further configured to send the update amount of the first model parameter value to the central server after the preset time period. The receiving unit is further configured to receive, after the preset time period, the first model parameter value sent by the central server.

In an embodiment, the sending unit is configured to send a packet to the central server, where the packet includes an update amount of a third model parameter value and a value of a corresponding identification bit, and the update amount of the third model parameter value includes an update amount of the second model parameter value and the update amount of the first model parameter value. In the preset time period, a value of an identification bit corresponding to the update amount of the first model parameter value indicates that the sending unit does not transmit the update amount of the first model parameter value to the central server. Alternatively, the sending unit sends a packet to the central server, where the packet includes the update amount of the second model parameter value and a value of a corresponding identification bit. In the preset time period, the update amount of the second model parameter value does not include the update amount of the first model parameter value, and the value of the identification bit corresponding to the update amount of the second model parameter value indicates that the sending unit transmits the update amount of the second model parameter value to the central server.

In an embodiment, the processing unit is configured to obtain the change amount of the first model parameter value based on historical information of the first model parameter value.

In an embodiment, the historical information of the value includes an effective change amount of the first model parameter value and an accumulated change amount of the first model parameter value.

In an embodiment, the processing unit is configured to: determine, based on the change amount of the first model parameter value, whether the first model parameter is stable; and if the change amount of the first model parameter value is less than a preset threshold, determine that the first model parameter is stable.

In an embodiment, the processing unit is configured to: determine the change amount of the first model parameter value M times, where M is a positive integer greater than or equal to 2. The determining, based on a stable status of the first model parameter at the $k^{th}$ time, a preset condition met by the preset time period includes: if it is determined, at the $k^{th}$ time based on the change amount of the first model parameter value, that the first model parameter is stable, duration of the preset time period is first duration, where the first duration is greater than second duration. The second duration is duration of a preset time period in which the sending unit stops sending the update amount of the first model parameter value to the central server when it is determined at the $(k-1)^{th}$ time that the first model parameter is stable; or the second duration is duration that is obtained when it is determined at the $(k-1)^{th}$ time that the first model parameter is unstable, and that is used to adjust duration of a corresponding preset time period when the first model parameter is stable next time, where k is a positive integer, and k≤M.

In an embodiment, the preset condition further includes: If it is determined at the $k^{th}$ time that the first model parameter is unstable, third duration used to adjust duration of a corresponding preset time period when the first model parameter is stable next time is obtained, where the third duration is less than fourth duration. The fourth duration is duration of a preset time period in which the sending unit stops sending the update amount of the first model parameter value to the central server when it is determined at the $(k-1)^{th}$ time that the first model parameter is stable; or the fourth duration is duration that is obtained when it is determined at the $(k-1)^{th}$ time that the first model parameter is unstable, and that is used to adjust duration of a corresponding preset time period when the first model parameter is stable next time.

In an embodiment, if the processing unit determines, at the $k^{th}$ time based on the change amount of the first model parameter value, that the first model parameter is stable, the sending unit stops sending the update amount of the first model parameter value to the central server in n sending periods, where n is a positive integer. After the n sending periods, if the processing unit determines, at the $(k+1)^{th}$ time based on the change amount of the first model parameter value, that the first model parameter is stable, the sending unit stops sending the update amount of the first model parameter value to the central server in (n+m) sending periods, where m is a positive integer. Alternatively, after the n sending periods, if the processing unit determines, at the $(k+1)^{th}$ time based on the change amount of the first model parameter value, that the first model parameter is unstable, the sending unit stops sending the update amount of the first model parameter value to the central server in (n/r+m) sending periods if the processing unit determines, at the $(k+2)^{th}$ time based on the change amount, that the first model parameter is stable, where r is a positive integer greater than or equal to 2, and (n/r)≥1. The sending period is a period in which the sending unit sends an update amount of a model parameter value to the central server.

In an embodiment, the processing unit is further configured to determine the change amount of the first model parameter value based on a detection period, where the sending period is less than the detection period.

In an embodiment, the processing unit is further configured to decrease a value of the preset threshold if the processing unit determines that a proportion of a quantity of stable first model parameters to a quantity of third model parameters is greater than a preset proportion.

In an embodiment, before the processing unit determines the change amount of the first model parameter value, the receiving unit receives the second model parameter value sent by the central server.

According to a fourth aspect, this application provides a model training-based communication apparatus. The apparatus includes a receiving unit, a processing unit, and a sending unit. The receiving unit is configured to receive an update amount that is of a second model parameter value and that is sent by a communication device, where in a preset time period, the update amount of the second model parameter value does not include an update amount of a first model parameter value; and a first model parameter is a stable model parameter determined based on a change amount of the first model parameter value. The processing unit is configured to determine an updated value of a second model parameter based on the update amount of the second model parameter value. The sending unit is configured to send the updated value of the second model parameter to the communication device, where in the preset time period, the updated value of the second model parameter does not include an updated value of the first model parameter.

In an embodiment, the sending unit is further configured to send the first model parameter value to the communication device after the preset time period. The receiving unit is further configured to receive the update amount that is of the first model parameter value and that is sent by the communication device.

In an embodiment, the sending unit is configured to send a packet to the communication device, where the packet includes an updated value of a third model parameter and a value of a corresponding identification bit, and the updated value of the third model parameter includes the updated value of the second model parameter and the updated value of the first model parameter. In the preset time period, a value of an identification bit corresponding to the updated value of the first model parameter indicates that the sending unit does not transmit the updated value of the first model parameter to the communication device. Alternatively, the sending unit sends a packet to the communication device, where the packet includes the updated value of the second model parameter and a value of a corresponding identification bit. In the preset time period, the updated value of the second model parameter does not include the updated value of the first model parameter, and the value of the identification bit corresponding to the updated value of the second model parameter indicates that the sending unit transmits the updated value of the second model parameter to the communication device.

In an embodiment, that the first model parameter is a stable model parameter determined based on a change amount of the first model parameter value includes: if the change amount of the first model parameter value is less than a preset threshold, determining that the first model parameter is stable.

In an embodiment, before the receiving unit receives the update amount that is of the second model parameter value and that is sent by the communication device, the sending unit sends the second model parameter value to the communication device.

According to a fifth aspect, this application provides a communication device, including: one or more processors, a memory, and a computer program. The computer program is stored in the memory, and the computer program includes instructions. When the instructions are executed by the communication device, the communication device is enabled to perform the model training-based communication method according to any one of the first aspect or the embodiments of the first aspect.

According to a sixth aspect, this application provides a central server, including: one or more processors, a memory, and a computer program. The computer program is stored in the memory, and the computer program includes instructions. When the instructions are executed by a central server, the central server is enabled to perform the model training-based communication method according to any one of the second aspect or the embodiments of the second aspect.

According to a seventh aspect, this application provides a communication system, including: a central server and at least one communication device. The at least one communication device performs the model training-based communication method according to any one of the first aspect or the embodiments of the first aspect. The central server performs the model training-based communication method according to any one of the second aspect or the embodiments of the second aspect.

According to an eighth aspect, this application provides a communication device, and the communication device has a function of implementing the model training-based communication method according to any one of the first aspect or the second aspect or the embodiments of the first aspect or the second aspect. The function may be implemented by hardware, or may be implemented by hardware executing corresponding software. The hardware or the software includes one or more modules corresponding to the function.

According to a ninth aspect, this application provides a computer storage medium, including computer instructions. When the computer instructions are run on a model training-based communication apparatus, the model training-based communication apparatus is enabled to perform the model training-based communication method according to any one of the first aspect or the second aspect or the embodiments of the first aspect and the second aspect.

According to a tenth aspect, this application provides a computer program product. When the computer program product is run on a model training-based communication apparatus, the model training-based communication apparatus is enabled to perform the model training-based communication method according to any one of the first aspect and the second aspect or the embodiments of the first aspect or the second aspect.

According to an eleventh aspect, a circuit system is provided. The circuit system includes a processing circuit, and the processing circuit is configured to perform the model training-based communication method according to any one of the first aspect or the second aspect or the embodiments of the first aspect or the second aspect.

According to a twelfth aspect, an embodiment of this application provides a chip system, including at least one processor and at least one interface circuit. The at least one interface circuit is configured to perform a receiving/transmitting function and send instructions to the at least one processor. When the at least one processor executes the instructions, the at least one processor performs the model training-based communication method according to any one of the first aspect or the second aspect or the embodiments of the first aspect or the second aspect.

For technical effects brought by any design manner in the second aspect to the twelfth aspect, refer to technical effects brought by different design manners in the first aspect. Details are not described herein again.

DESCRIPTION OF EMBODIMENTS

The following describes in detail the model training-based communication method and, apparatus, and a system provided in the embodiments of this application with reference to the accompanying drawings.

The solutions in the embodiments of this application are mainly applied to a distributed machine learning system, and the distributed machine learning system includes a central server and a plurality of communication devices. Each communication device has its own processor and memory and has an independent data processing function. In the distributed machine learning system, the communication devices have a same status and store user data, and the communication devices do not share the user data with each other, so that efficient machine learning can be performed between the plurality of communication devices while ensuring information security during exchange of big data and protecting privacy of terminal data and personal data.

Figure 1:
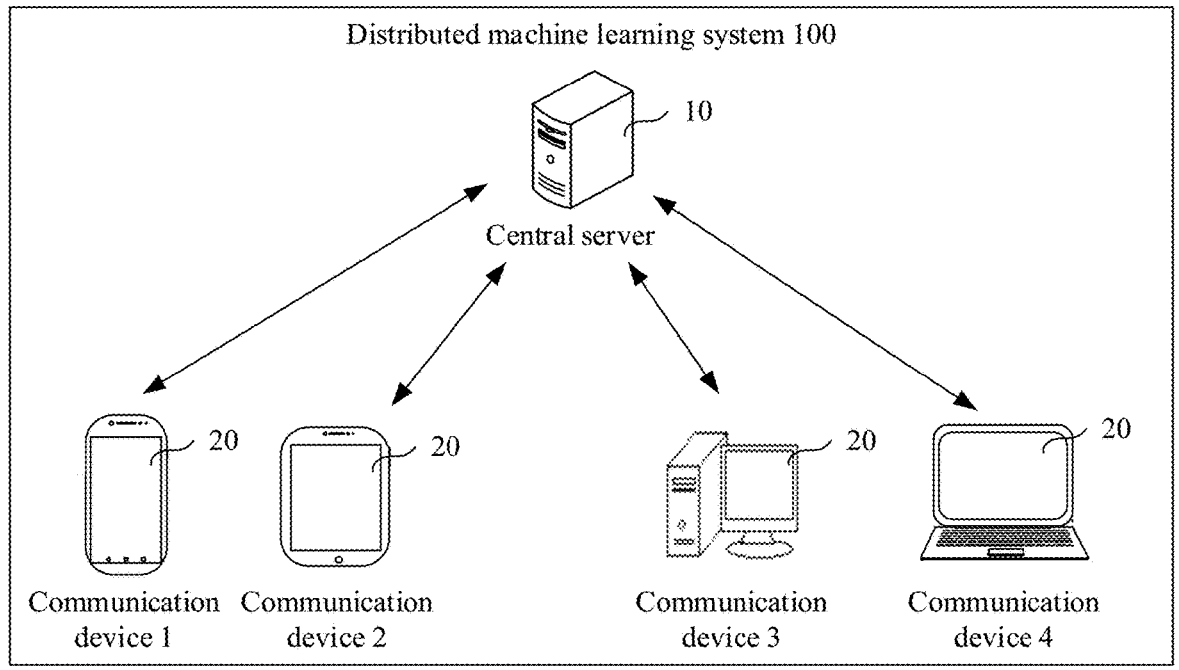
FIG. 1 is a schematic diagram of an application scenario of a model training-based communication method according to an embodiment of this application.

For example, as shown in FIG. 1, a distributed machine learning system 100 includes a central server 10 and at least one communication device 20, for example, a communication device 1, a communication device 2, a communication device 3, and a communication device 4 in FIG. 1. The central server 10 may be connected to the at least one communication device 20 by using a wired network or a wireless network. A manner of connection between the central server 10 and the at least one communication device 20 is not limited in this embodiment of this application.

The central server 10 may be a device or a server that has a computing function, such as a cloud server or a network server. The central server 10 may be a server, a server cluster including a plurality of servers, or a cloud computing service center. The central server 10 stores a neural network model, and may send a parameter value of the neural network model to the at least one communication device 20 by using an interaction interface.

The communication device 20 may also be referred to as a host, a model training host, or the like. The communication device 20 may be a server or may be a terminal device, and may provide a related human-computer interaction interface to collect model training-based local user data. For example, the communication device 20 may include a mobile phone, a tablet computer (Pad), a computer with a wireless receiving/transmitting function, a virtual reality (VR) electric device, an augmented reality (AR) electric device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, an in-vehicle terminal, an artificial intelligence (AI) terminal, or the like. A specific form of the communication device is not specially limited in this embodiment of this application.

The communication device 20 stores local data. The communication device 20 may receive the parameter value that is of the neural network model and that is sent by the central server 10, to construct a local model, and use the local data as training data to train the local model. It may be understood that a model obtained through training by using a larger data amount of training data has better performance. Because a single communication device 20 includes a limited data amount of local data, precision of a trained local model is limited. If a model parameter value and an update amount of the value are transmitted between a plurality of communication devices 20, to increase an amount of data included in the training data, it is not helpful in protecting private data.

Considering protection of private data and data security, the distributed machine learning system 100 may optimize the local model in each communication device 20 while the communication devices 20 do not need to share the local data with each other. As shown in FIG. 1, instead of sharing the local data, each communication device 20 sends, to the central server 10, update amounts of each parameter value of the local model that are before and after training. The central server 10 trains the model by using the update amount that is of the model parameter value and that is sent by each communication device 20, and sends a parameter value of a trained model to each communication device 20. Each communication device 20 then trains, by using the local data, a local model constructed by using an updated model parameter value. In this way, after the foregoing operations are cycled, the central server 10 may obtain a neural network model with better performance, and send the neural network model to each communication device 20. The update amount may also be referred to as a gradient.

It should be noted that in some documents, the machine learning process is described as federated learning. Therefore, the distributed machine learning system may also be described as a distributed federated learning system. The technical solution in this embodiment of this application may be a model training-based communication method, or may be described as a federated learning-based communication method. In other words, a federated learning process may also be described as a model training process.

The distributed machine learning system 100 may be applied to the following scenarios.

Scenario 1: A Scenario of Improving Input Performance of an Input Method of a Mobile Phone For example, the input method of the mobile phone may predict and display, based on a word currently input by a user, a word that may be subsequently input. A prediction model used in the input method needs to be trained based on user data, to improve prediction accuracy of the prediction model. However, some personal data of the user cannot be directly shared, for example, sensitive data such as a website visited by the user and a travel location of the user.

Therefore, Google proposes a method for improving, based on a distributed machine learning system, a model for predicting a word that is input to a mobile phone. First, a central server in Google sends a parameter value of a prediction model to a plurality of mobile phones, and then may obtain an update amount that is of the model parameter value and that is obtained by each mobile phone by training the prediction model based on local user data of the mobile phone. The central server obtains a unified new prediction model by performing superimposed averaging on the update amounts of the parameter value of the prediction model that are fed back by the mobile phones. In this way, a prediction model with high prediction precision can be finally obtained through continuous iterative update while the mobile phone does not need to share the local user data, thereby improving performance of an input method of the mobile phone.

An application scenario of the distributed machine learning system may include the scenario 1 based on a large quantity of communication devices, and may further include a scenario based on a limited quantity of communication devices, such as the following scenario 2.

Scenario 2: A Scenario of Improving a Medical Prediction Model

For example, in a hospital, patient data is training data required for establishing a prediction model for developing a treatment method and obtaining a treatment prediction result. When the patient data is used for model training, results caused by actual and potential invasion of patient privacy may be serious.

Therefore, based on the distributed machine learning system, each hospital may train a prediction model by using patient data owned by the hospital, without sharing the patient data of the hospital. The central server integrates update amounts of all prediction model parameter values to finally obtain a prediction model with relatively high precision that integrates the patient data of all the hospitals, and sends a final model parameter value to each hospital, to improve the medical prediction model of the hospital.

Figure 2:
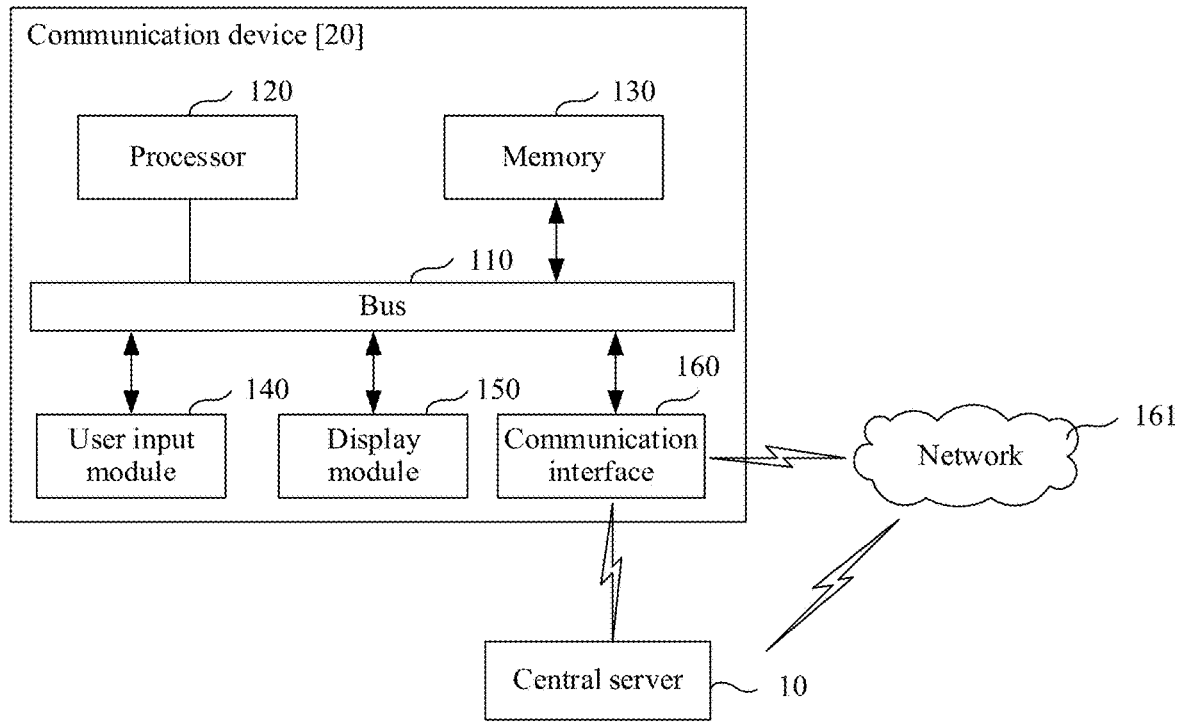
FIG. 2 is a schematic diagram of a hardware structure of a communication device according to an embodiment of this application.

FIG. 2 is a schematic diagram of a hardware structure of a communication device 20 according to an embodiment of this application. The communication device 20 includes a bus 110, a processor 120, a memory 130, a user input module 140, a display module 150, a communication interface 160, and another similar and/or appropriate component.

The bus 110 may be a circuit that interconnects the foregoing elements and performs transmission and communication between the foregoing elements.

The processor 120 may receive a command from another foregoing element (for example, the memory 130, the user input module 140, the display module 150, or the communication interface 160) by using the bus 110, may interpret the received command, and may perform calculation or data processing based on the interpreted command.

The processor 120 may be a general-purpose Central Processing Unit (CPU), a microprocessor, an Application-Specific Integrated Circuit (ASIC), or one or more integrated circuits configured to control program execution of the solutions in this application.

In some embodiments, the processor 120 is configured to establish a local model based on a received model parameter value sent by the central server 10, and train the local model by using local user data, to obtain an update amount of the model parameter value.

The memory 130 may store a command or data received from the processor 120 or another component (for example, the user input module 140, the display module 150, or the communication interface 160), or a command or data generated by the processor 120 or another component.

The memory 130 may be a Read-Only Memory (ROM) or another type of static storage device that can store static information and instructions, a Random Access Memory (RAM) or another type of dynamic storage device that can store information and instructions; or may be an Electrically Erasable Programmable Read-Only Memory (EEPROM), a Compact Disc Read-Only Memory (CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory 130 may exist independently, and is connected to the processor 120 by using the bus 110. The memory 130 may be integrated with the processor 120.

The memory 130 is configured to store computer-executable instructions used to implement the solutions in this application, and execution is controlled by the processor 120. The processor 120 is configured to execute the computer-executable instructions stored in the memory 130, to implement the model training-based communication method provided in the following embodiments of this application.

Optionally, the computer-executable instruction in this embodiment of this application may also be referred to as application program code, an instruction, a computer program, or another name. This is not limited in this embodiment of this application.

In some embodiments, the memory 130 stores user data that is input by the communication device 20 in a human-computer interaction manner by using the user input module 140, or user data obtained by the communication device 20 in another manner. The processor 120 may perform model training by invoking the user data stored in the memory 130. Further, the processor 120 may obtain the user data on line to perform model training. This is not limited in this embodiment of this application.

The user input module 140 may receive data or a command that is input by a user by using an input-output means (for example, a sensor, a keyboard, or a touchscreen), and may transmit the received data or command to the processor 120 or the memory 130 by using the bus 110.

The display module 150 may display various types of information (such as multimedia data and text data) received from the foregoing elements.

The communication interface 160 may control communication between the communication device 20 and the central server 10. When the communication device 20 is paired with and connected to the central server 10, the communication device 20 may receive, by using the communication interface 160, a model parameter value sent by the central server 10, and send an update amount of the model parameter value to the central server; and may also control a period for sending the update amount of the model parameter value. The processor 120 may control the communication interface 160 to perform the period for sending the update amount of the model parameter value.

According to the embodiments disclosed in this application, the communication interface 160 may communicate with the central server 10 directly or by using a network 161. For example, through an operation, the communication interface 160 may connect the communication device 20 to the network 161.

It should be understood that the hardware structure of the communication device 20 shown in the figure is merely an example, and the communication device 20 may have more or fewer components than those shown in FIG. 2, may combine two or more components, or may have different component configurations.

Currently, based on a communication method in a distributed model training system for machine learning based on a distributed machine learning system, generally, a central server sends all model parameter values to a communication device; and the communication device obtains update amounts of all the model parameter values based on the model parameter values, and sends the update amounts of all the model parameter values to the central server. In a data transmission process, a relatively large amount of data is transmitted between the central server and the communication device. However, actually, at an early stage before a model is converged, some model parameters are converged and stable, and a subsequent change of the model parameter value merely fluctuates at a small amplitude, and has little significance for model training.

In view of this, an embodiment of this application provides a model training-based communication method. Whether a model parameter is stable may be determined based on a change amount of a transmitted model parameter value, to determine whether to stop transmitting an update amount of the corresponding model parameter value. In this way, an amount of transmitted data may be decreased without a loss of model training precision, thereby improving communication efficiency.

Figure 3:
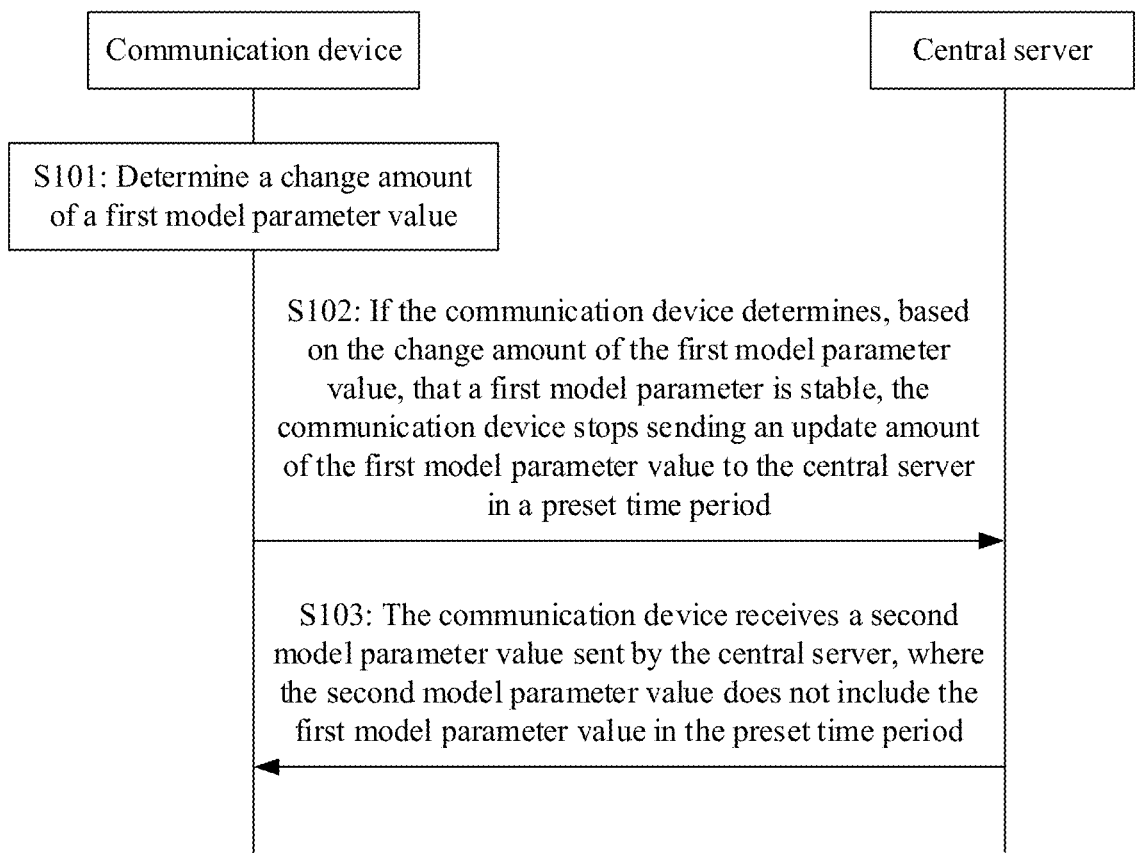
FIG. 3 is a first schematic flowchart of a model training-based communication method according to an embodiment of this application.

FIG. 3 is a schematic flowchart of a model training-based communication method according to an embodiment of this application. The method may include S101 to S103.

S101: A communication device determines a change amount of a first model parameter value.

A first model parameter may be at least one model parameter that is in model parameters sent by a central server and that is received by the communication device. To be specific, change amounts of all received model parameter values may be determined, or change amounts of only some of all the received model parameter values may be determined. For example, the communication device receives 100 model parameter values, and two of the 100 model parameter values have great impact on a model training process. Therefore, the two model parameter values need to be continuously updated in the model training process. Therefore, a quantity of first model parameter values is 98. After the communication device receives the 100 model parameter values sent by the central server, the communication device determines change amounts of the 98 first model parameter values other than the foregoing two model parameter values.

For example, it may be learned from the foregoing description that in a distributed machine learning system, the communication device receives the first model parameter value sent by the central server, and the communication device may obtain the change amount of the first model parameter value based on historical information of the received first model parameter value.

The historical information may include an effective change amount of the first model parameter value and an accumulated change amount of the first model parameter value.

In some embodiments, an exponential moving average (EMA) method is used to obtain the change amount of the first model parameter value based on the effective change amount of the first model parameter value and the accumulated change amount of the first model parameter value.

For example, the communication device obtains the change amount P of the first model parameter value based on a ratio of the effective change amount $E_k$ of the first model parameter value to the accumulated change amount $E_k^{abs}$ of the first model parameter value, where the effective change amount and the accumulated change amount are obtained at the $k^{th}$ time. The change amount is $P=|E_k|/E_k^{abs}$, and initial values of the effective change amount $E_k$ and the accumulated change amount $E_k^{abs}$ of the first model parameter value are 0.

If k=1, $|E_k|=E_k^{abs}$, and the change amount of the first model parameter value is P=1.

If k is a positive integer greater than or equal to 2, the effective change amount is $E_k=\alpha E_{k-1}+(1-\alpha)\Delta k$, and the accumulated change amount is $E_k^{abs}=\alpha E_{k-1}^{abs}+(1-\alpha)|\Delta k|$. $\alpha$ is a weight parameter and indicates an attenuation degree of a weight, where $0<\alpha<1$. $E_{k-1}$ is the effective change amount of the first model parameter value at the $(k-1)^{th}$ time, $E_{k-1}^{abs}$ is the accumulated change amount of the first model parameter value at the $(k-1)^{th}$ time, and $\Delta k$ is a difference between a first model parameter value obtained at the $k^{th}$ time and that obtained at the $(k-1)^{th}$ time. $\alpha$ is a variable and exponentially decreases based on a quantity of times of calculation. For a specific obtaining manner of $\alpha$, refer to the conventional technology. Details are not described in this embodiment of this application.

For example, if k=2, that is, the first model parameter value is currently a first model parameter value obtained by the communication device at the second time, it is assumed that a first model parameter value at the first time is −4, the first model parameter value at the second time is 6, and $\alpha=0.5$. In this case, the effective change amount of the first model parameter value at the second time is $E_2=\alpha E_1+(1-\alpha)\Delta k=\alpha(1-\alpha)\Delta k_1+(1-\alpha)\Delta k_2=0.5*(1-0.5)*(-4)+(1-0.5)*(6-(-4))=4$, and the accumulated change amount of the first model parameter value is $E_2^{abs}=\alpha E_1^{abs}+(1-\alpha)|\Delta k|=\alpha(1-\alpha)|\Delta k_1|+(1-\alpha)|\Delta k_2|=0.5*(1-0.5)*|-4|+(1-0.5)*|(6-(-4))|=6$. Then, it may be learned that the change amount of the first model parameter value is $P=|E_2|/E_2^{abs}=4/6\approx0.667$.

In this way, a memory of the communication device only needs to store a first model parameter value obtained last time, and an effective change amount and an accumulated change amount of the first model parameter value that are determined last time, and then the communication device can determine, based on a first model parameter value received this time, a current effective change amount and accumulated change amount of the first model parameter value, and then determine the change amount of the first model parameter value. Therefore, the change amount of the first model parameter value can be determined by using relatively small storage space.

In some other embodiments, the communication device may determine a current change amount of the first model parameter value based on a change amount of the first model parameter value in each of recent several times of detection.

For example, change amounts of the first model parameter value that are obtained by the communication device recent times are respectively $k_1, k_2, k_3, \ldots$, and $k_a$. In this case, the effective change amount of the first model parameter value is $E_k=\Sigma_{b-1}^a k_b$, and the accumulated change amount of the first model parameter value is $E_k^{abs}=\Sigma_{b-1}^a |k_b|$. Therefore, the change amount of the first model parameter value is $P=|E_k|/E_k^{abs}$, where b is a natural number and is intermediate data used for calculation. For example, a=3. In this case, the effective change amount of the first model parameter value in the sixth time of detection is $E_6=\Sigma_{b-1}^3 k_b=k_0+k_1+k_2+k_3$, where $k_0$ indicates a difference between a first model parameter value obtained in the sixth time of detection and that obtained in the fifth time of detection.

It may be understood that if an amount of data stored in the communication device is insufficient, all the stored data may be used to determine the change amount of the first model parameter value. For example, assuming that a=10, the communication device needs to store recent ten change amounts of the first model parameter value. When a quantity of stored change amounts of the first model parameter value is insufficient, a current change amount of the first model parameter value is obtained by using all the stored change amounts of the first model parameter value. For example, if in the sixth time of detection, the memory stores only data in the first five times of detection, which is less than ten times of detection, a current change amount of the first model parameter value is obtained by using the data in the five times of detection.

S102: If the communication device determines, based on the change amount of the first model parameter value, that the first model parameter is stable, the communication device stops sending an update amount of the first model parameter value to the central server in a preset time period.

The communication device is configured to perform model training based on user data, and determine an update amount of a model parameter value in a model training process, where the update amount may also be referred to as a gradient. After receiving an updated model parameter value sent by the central server, the communication device constructs a model and trains the model by using local user data. In the training process, the model parameter value is adjusted based on the user data, to obtain the update amount of the model parameter value, and the update amount of the model parameter value is sent to the central server based on a sending period. The sending period may be determined based on a bandwidth of the communication device. For a specific determining method, refer to the conventional technology. This is not limited in this embodiment of this application.

For example, a detection period may be set. The communication device obtains the change amount of the first model parameter value based on the detection period, that is, periodically determines, based on the detection period, whether the first model parameter is stable. It may be understood that the communication device also sends the update amount of the first model parameter value to the central server based on a preset sending period. In addition, the change amount of the first model parameter value is generated only after data is sent and received. Therefore, the sending period needs to be less than the detection period. For example, the sending period is 5 s, and the detection period is 10 s. In this case, the communication device sends the update amount of the first model parameter value to the central server every 5 s, and similarly, the central server sends the first model parameter value to the communication device every 5 s. However, the communication device determines the change amount of the first model parameter value every 10 s, and determines, based on the change amount, whether the first model parameter is stable.

In this way, the change amount of the first model parameter value may be periodically determined by using operation S101, and then whether the first model parameter is stable is determined based on the change amount of the first model parameter value. For example, a preset threshold may be set based on experimental data, a historical experience value, or the like. If the change amount that is of the first model parameter value and that is obtained by using the method in operation S101 is less than the preset threshold, it is determined that the first model parameter is stable. If the first model parameter is stable, the communication device stops sending the update amount of the first model parameter value to the central server in the preset time period. Correspondingly, the central server also stops sending the first model parameter value to the communication device in the preset time period. In other words, after the first model parameter is stable, the first model parameter value and the update amount of the value are not transmitted between the communication device and the central server. This process may also be understood as that the first model parameter is frozen after the first model parameter is stable. To be specific, the first model parameter is a model parameter participating in determining whether a model parameter is stable, a quantity of first model parameters is not limited, and the first model parameter may be any one or more model parameters. If it is determined that the first model parameter is stable, the first model parameter is a model parameter that does not participate in transmission in the preset time period. A second model parameter is a model parameter that participates in transmission of an update amount and a value between the central server and the communication device. A quantity of second model parameters is also not limited, and there may be one or more second model parameters. Optionally, all first model parameters and all second model parameters form all model parameters (which may also be referred to as third model parameters).

In some embodiments, historical information of the first model parameter no longer changes in the preset time period in which transmission of the first model parameter stops. After the preset time period, the communication device sends the update amount of the first model parameter value to the central server and receives the first model parameter value sent by the central server. Therefore, after the preset time period arrives, and the first model parameter automatically starts to participate in transmission, the communication device also starts to automatically record historical information, for example, the communication device automatically starts to record the effective change amount of the first model parameter value and the accumulated change amount of the first model parameter value.

Figure 4:
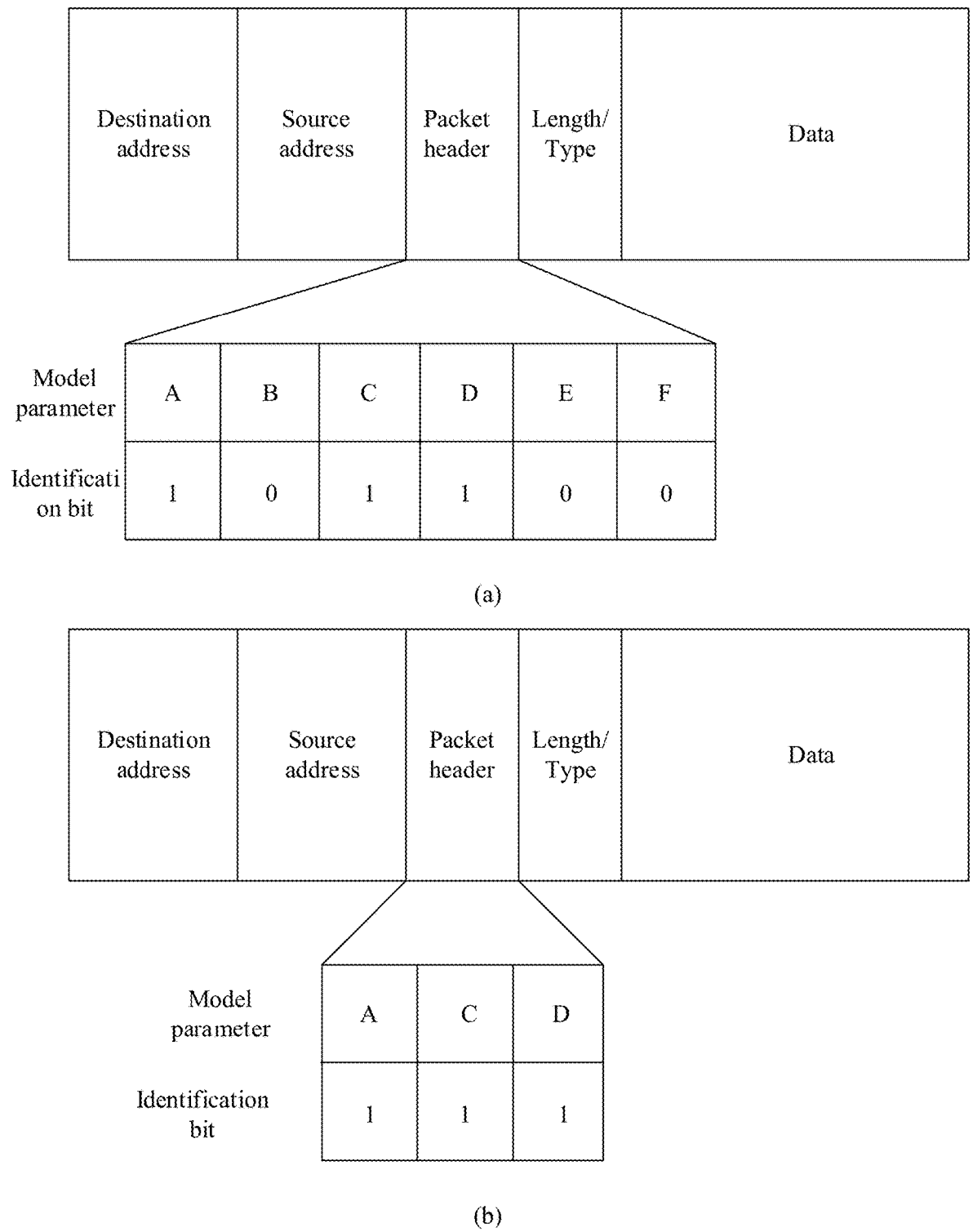
FIG. 4 is a schematic diagram of a structure of a packet according to an embodiment of this application.

In some embodiments, a model parameter value and an update amount may be transmitted between the communication device and the central server by using a packet. (a) in FIG. 4 shows a structure of a packet according to an embodiment of this application, and the packet includes a packet header and data of the packet. Packet header information includes a destination address, a source address, the packet header, and a length/type that are of the packet.

Both the source address and the destination address are Media Storage Control (MAC) bit addresses. For a specific structure of the packet, refer to the conventional technology. In this embodiment of this application, the packet header includes an identification bit corresponding to an update amount of a model parameter value.

In a possible design of the packet, the packet carries an update amount of a third model parameter (all model parameters included in the model) value and a value of a corresponding identification bit, and the value of the identification bit indicates whether the communication device transmits the update amount of the third model parameter value to the central server. For example, a special character may be set in an identification bit. For example, when a value of the identification bit is "1", it indicates that the communication device sends, to the central server, an update amount that is of a model parameter value and that corresponds to the identification bit. Alternatively, when the value of the identification bit is "0", it indicates that the communication device does not send, to the central server, the update amount that is of the model parameter value and that corresponds to the identification bit. In this way, the central server learns, based on the value of the identification bit in the packet header, that the communication device does not transmit the update amount of the first model parameter value in the preset time period, but transmits an update amount of a second model parameter value. In other words, an update amount that is of a model parameter value and that is transmitted between the communication device and the central server is the update amount of the third model parameter value, where the update amount of the third model parameter value includes the update amount that is of the second model parameter value and that can be transmitted after determining, and the update amount that is of the first model parameter value and that cannot be transmitted in the preset time period. For example, as shown in (a) in FIG. 4, in an embodiment of an identification bit corresponding to an update amount of a model parameter value, it is assumed that third model parameters include six model parameters: A, B, C, D, E, and F. If the communication device determines that first model parameters B, E, and F are stable, values of identification bits corresponding to update amounts of values of the three first model parameters B, E, and F are 0. Values of identification bits corresponding to update amounts of values of three second model parameters A, C, and D are 1. In this case, it indicates that a data segment of the packet transmitted this time includes data corresponding to the model parameters A, C, and D, and does not include data corresponding to the model parameters B, E, and F.

In another possible design of the packet, the packet header includes the update amount of the second model parameter value and a value of a corresponding identification bit. In the preset time period, the update amount of the second model parameter value does not include the update amount of the first model parameter value, and the value of the identification bit corresponding to the update amount of the second model parameter value indicates that the communication device transmits the update amount of the second model parameter value to the central server. For example, as shown in (b) in FIG. 4, in an embodiment of an identification bit corresponding to an update amount of a model parameter value, the values that are of the identification bits corresponding to the update amounts of the values of the three second model parameters A, C, and D and that are carried in the packet may be set to 1, which indicates that a data segment of the packet transmitted this time includes the data corresponding to the model parameters A, C, and D.

It may be understood that there may be another manner of designing the packet header, to indicate a meaning of a transmitted model parameter. For example, a sequence of the update amount of the third model parameter value in a packet that needs to be transmitted is preset between the communication device and the central server. Then, after determining that the first model parameter is stable, the communication device directly does not include, in the packet transmitted to the central server, the update amount of the first model parameter value. The central server may also determine, based on a vacant bit, a specific first model parameter value whose update amount stops to be transmitted, and may also learn of a specific second model parameter value whose update amount corresponds to transmitted data. For another example, when the communication device does not send the update amount of the first model parameter value to the central server, the identification bit corresponding to the update amount of the first model parameter value may be empty. In this way, the central server may learn, based on an empty value of an identification bit in the packet, that in the preset time period, an update amount that is of a model parameter value and that corresponds to the empty identification bit is the update amount that is of the first model parameter value that is not transmitted by the communication device.

In some embodiments, each time the communication device determines that the first model parameter is stable and when the communication device needs to stop transmitting the update amount of the first model parameter value, the communication device further needs to determine a proportion of a quantity of first model parameters to a quantity of third model parameters. The communication device decreases a value of the preset threshold if the communication device determines that a proportion of a quantity of stable first model parameters to the quantity of third model parameters is greater than a preset proportion. In other words, after a quantity of model parameters whose transmission stops reaches a specific proportion, a threshold for determining whether a model parameter is stable needs to be decreased, to decrease the quantity of model parameters whose transmission stops, and ensure a quantity of model parameters with updated values in model parameters participating in model training.

In this way, the preset threshold is dynamically adjusted, to prevent an excessively large quantity of model parameters whose transmission stops from prolonging a model training process or affecting final model precision. For example, after transmission of a large quantity of model parameters stops, the model can be trained in the preset time period by using only unchanged values of the model parameters whose transmission stops, and a training effect may not be ideal. Updated values of the model parameters whose transmission stops can be obtained only after duration of preset time periods of these model parameters arrives, to continue to train the model, which causes excessively long training time for the model to meet a model convergence condition.

S103: The communication device receives the second model parameter value sent by the central server. In the preset time period, the second model parameter value does not include the first model parameter value.

For example, after the communication device sends the update amount of the second model parameter value to the central server, the central server obtains an updated second model parameter value based on an obtained update amount that is of a model parameter value and that is sent by one or more communication devices, and sends an updated value of the second model parameter to the corresponding communication device. In the preset time period, if the first model parameter does not participate in transmission, the updated value of the second model parameter does not include an updated value of the first model parameter.

In some embodiments, after the preset time period, the communication device sends the update amount of the first model parameter value to the central server and receives the first model parameter value sent by the central server.

In other words, if the communication device does not send the update amount of the first model parameter value to the central server in the preset time period, the central server does not generate and send the updated value of the first model parameter to the communication device in the preset time period, to decrease an amount of bidirectional data between the communication device and the central server. However, after the preset time period, the communication device and the central server automatically start to transmit the first model parameter value and the update amount of the value, to adaptively adjust an amount of transmitted data.

For example, if the communication device determines the change amount of the first model parameter value, the communication device needs to first receive the first model parameter value sent by the central server, to determine the change amount of the first model parameter value based on a first model parameter value received this time and a previously received first model parameter value. Therefore, before operation S101, operation S104 may be further included.

S104: The communication device receives the first model parameter value sent by the central server.

In some embodiments, initially, the third model parameter value that is sent by the central server and that is received by the communication device is all model parameter values used for model training. In a subsequent interaction process, a quantity of third model parameters changes based on a quantity of update amounts that are of model parameters values and that are sent by the communication device to the central server, for example, the third model parameter changes to the second model parameter other than the first model parameter whose transmission stops. To be specific, the central server determines, only after the communication device sends an update amount of a model parameter value to the central server, an updated value of a model parameter based on the update amount of the model parameter value, and then sends the updated value to the communication device. Subsequently, based on the detection period, the communication device determines, only after receiving the second model parameter value, stability of all or some of the model parameters, where the all or some of the model parameters are first model parameters in operation S101. In a distributed machine learning system, a model training process includes an interaction process in which an update amount and a value of a model parameter are transmitted between the communication device and the central server. In the interaction process, model convergence is implemented, to complete the training process.

In operation S101 to operation S103, each communication device determines stability of the first model parameter value to determine whether to stop transmitting the update amount of the first model parameter value. It may be understood that, the central server may alternatively determine stability of the first model parameter value to determine whether to stop transmitting the first model parameter value. In addition, the central server may send a notification to each corresponding communication device to notify the corresponding communication device of a determining result, to ensure that each communication device learns of whether to stop sending the update amount of the first model parameter value to the central server in a next sending period.

Therefore, according to the model training-based communication method provided in this embodiment of this application, if it is determined that the first model parameter value is stable, transmission of the update amount of the first model parameter value stops in the preset time period, so that an amount of data transmitted between the communication device and the central server can be flexibly decreased without a loss of model training precision, thereby improving communication efficiency.

Figure 5A:
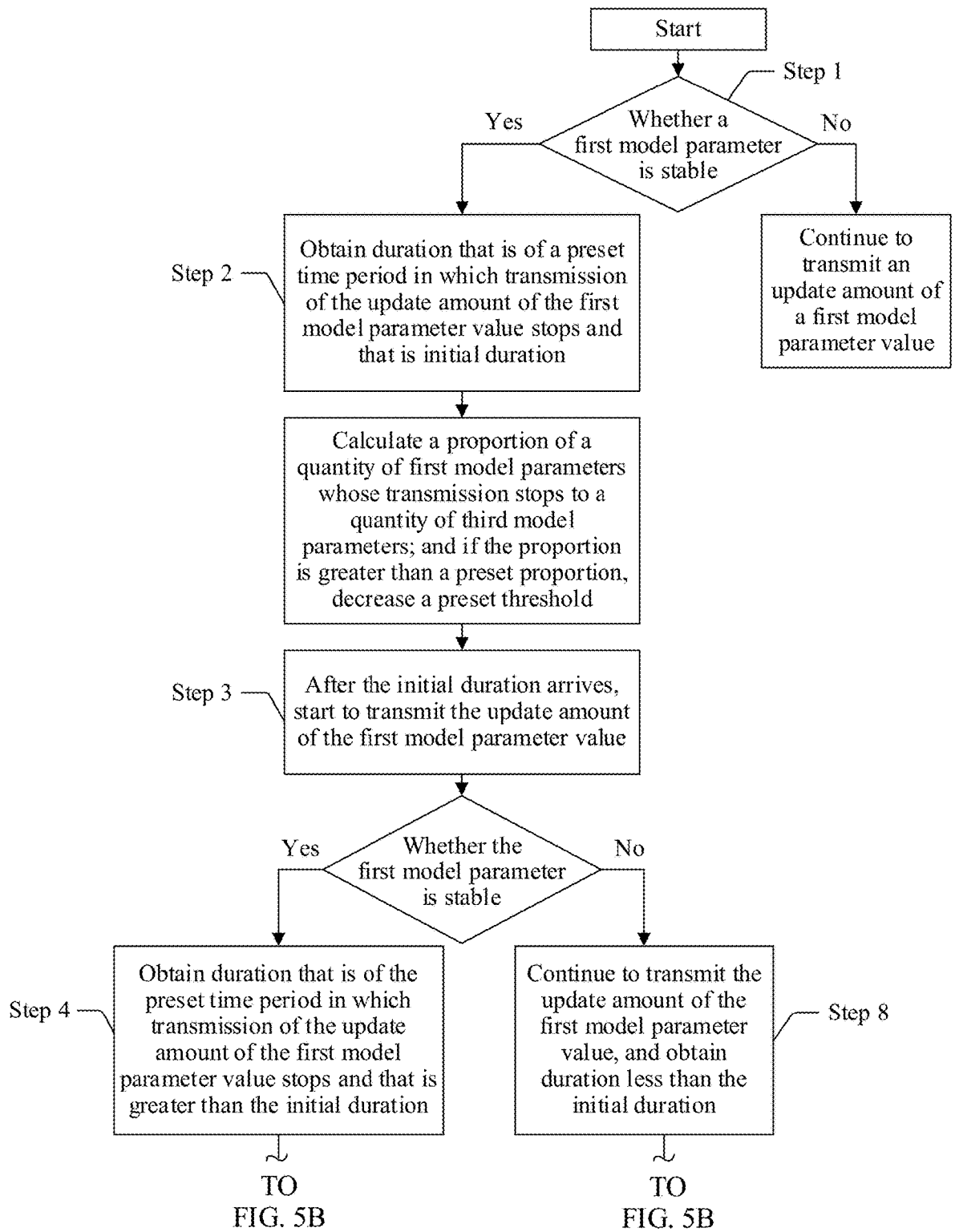
FIG. 5A and FIG. 5B are a second schematic flowchart of a model training-based communication method according to an embodiment of this application.
Figure 5B:
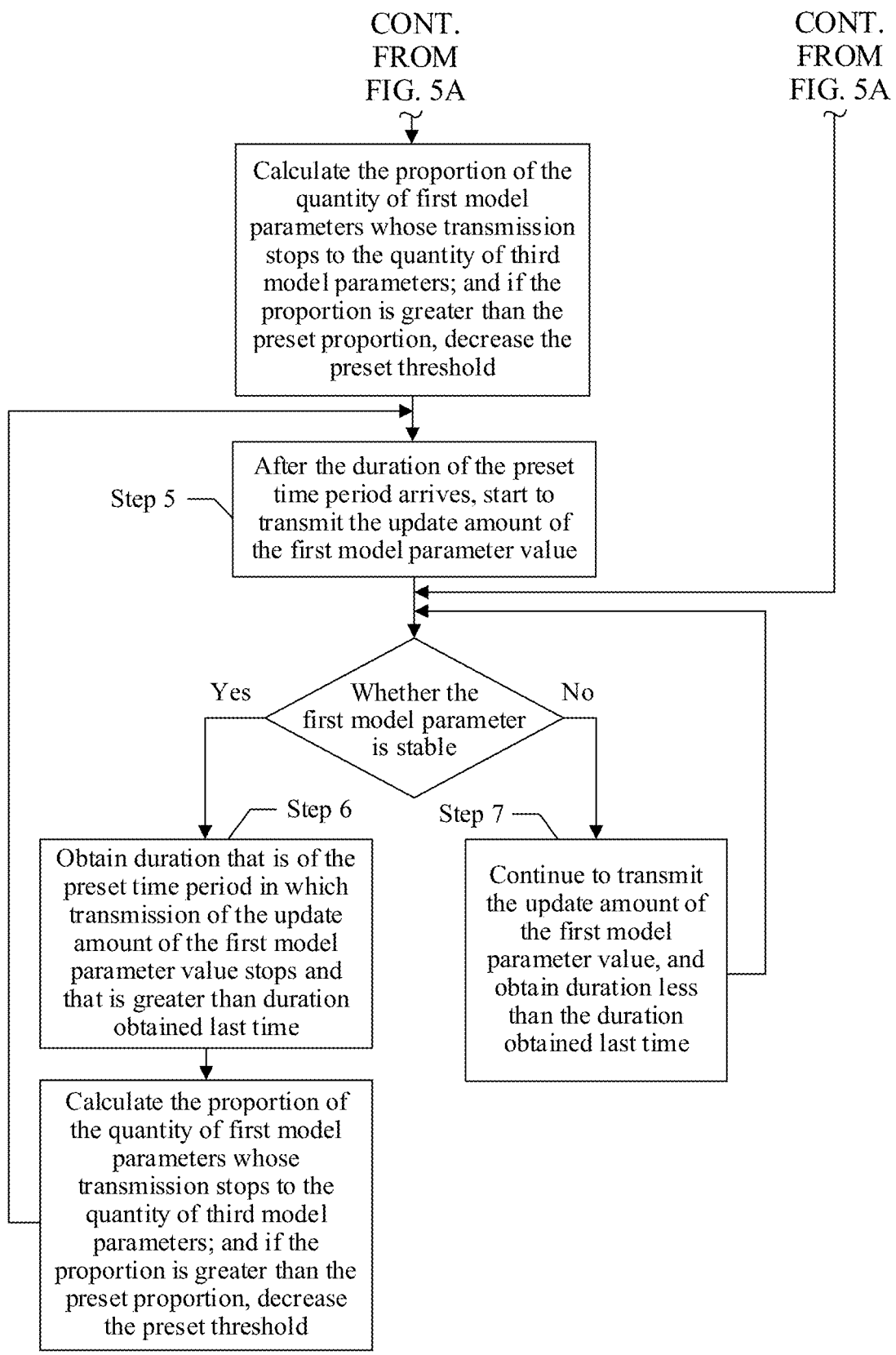

In operation S102, the communication device sends an update amount of a model parameter value to the central server based on the sending period and receives the model parameter value sent by the central server. The communication device detects stability of the model parameter value based on the detection period, determines an update amount that is of a model parameter value and whose transmission can stop, and obtains duration in each time of detection. If the first model parameter is stable, the obtained duration is duration of a preset time period in which transmission stops; or if the first model parameter is unstable, the obtained duration is duration used to adjust duration obtained when it is determined next time whether the first model parameter value is stable. In this way, in a process in which a model parameter value and an update amount of the value are interactively transmitted between the communication device and the central server, a model parameter whose transmission can stop and corresponding duration may be flexibly adjusted. Referring to a flowchart shown in FIG. 5A and FIG. 5B, the following operations may be used to implement the process of cyclic interactive transmission of the model parameter value and the update amount of the value between the communication device and the central server, and flexibly adjust the obtained duration. The duration of the preset time period in which transmission of the first model parameter stops may be an integer multiple of the sending period, or may be any self-defined duration. This is not limited in this embodiment of this application.

Step 1: Determine whether the first model parameter is stable.

For example, after a model training process starts, the communication device receives the third model parameter value sent by the central server. The communication device constructs a local model by using the third model parameter value, trains the model by using local data, and sends the update amount of the third model parameter value to the central server based on a sending period. The third model parameter value is all model parameter values used to construct the model. When the model training process starts for the first time, the central server sends all the model parameter values to the communication device to construct an initial model.

Then, the communication device receives an updated third model parameter value sent by the central server, and determines, by using the methods in operation S101 and operation S102, whether the first model parameter value is stable. If the first model parameter is stable, operation 2 is performed; or if the first model parameter is unstable, the update amount of the first model parameter value continues to be transmitted.

Step 2: Obtain duration that is of the preset time period in which transmission of the update amount of the first model parameter value stops and that is initial duration.

For example, after it is determined that the first model parameter is stable, it indicates that the first model parameter is converged, and transmission of the update amount of the first model parameter value may stop in the preset time period, thereby reducing an amount of data communicated between the communication device and the central server. In this case, the obtained duration of the preset time period in which transmission of the update amount of the first model parameter value needs to stop is the initial duration. The initial duration may be an integer multiple of the sending period or may be a self-defined time period. Subsequently, the duration may be adjusted by increasing or decreasing a quantity of sending periods or prolonging or shortening the self-defined time period.

In some embodiments, after it is determined that transmission of the update amount of the first model parameter value needs to stop, a proportion of a quantity of first model parameters whose transmission stops to a quantity of third model parameters further needs to be calculated. If the proportion is greater than a preset proportion, the preset threshold is decreased. The preset threshold for determining whether the first model parameter is stable is decreased, so that a quantity of model parameters whose transmission stops can be decreased in a subsequent process of determining whether the first model parameter is stable, thereby ensuring model training precision. The preset proportion may be self-set based on an experience value.

Step 3: After the initial duration arrives, start to transmit the update amount of the first model parameter value.

For example, after the preset time period arrives, the first model parameter whose transmission stops automatically participates in transmission based on the sending period. In a transmission process, whether the first model parameter is stable is determined based on a detection period. If the first model parameter is stable, operation 4 is performed; or if the first model parameter is unstable, operation 8 is performed.

Step 4: Obtain duration that is of the preset time period in which transmission of the update amount of the first model parameter value stops and that is greater than the initial duration.

For example, after it is determined that the first model parameter is stable, the duration of the preset time period in which transmission of the update amount of the first model parameter value stops needs to be obtained, and transmission stops in the preset time period. Because the duration obtained when the first model parameter is determined last time is the initial duration, the duration of the preset time period obtained this time when it is determined that the first model parameter is stable needs to be greater than the initial duration obtained last time. For example, if initial duration obtained in a last detection period of a model parameter 1 is one sending period, the model parameter 1 automatically participates in transmission after transmission of the model parameter 1 stops for one sending period. Because the sending period is less than the detection period, after participating in transmission for a period of time, the model parameter 1 is detected again. If it is determined this time that the model parameter 1 is stable, duration that is of the preset time period and that is greater than one sending period may be obtained, for example, two sending periods.

In some embodiments, similar to operation 2, the proportion of the quantity of first model parameters whose transmission stops to the quantity of third model parameters needs to be calculated. If the proportion is greater than the preset proportion, the preset threshold is decreased.

Step 5: After the duration of the preset time period arrives, start to transmit the update amount of the first model parameter value.

For example, after the duration of the preset time period arrives, the first model parameter whose transmission stops automatically starts to participate in transmission, and continues to participate in determining stability of the first model parameter. If the first model parameter is stable, operation 6 is performed; or if the first model parameter is unstable, operation 7 is performed.

Step 6: Obtain duration that is of the preset time period in which transmission of the update amount of the first model parameter value stops and that is greater than the duration obtained last time.

For example, because the first model parameter is stable this time, the duration of the preset time period in which transmission of the update amount of the first model parameter value stops needs to be obtained, and transmission stops in the preset time period. The duration of the preset time period in which transmission stops needs to be greater than the duration obtained in last detection.

In some embodiments, similar to operation 2, the proportion of the quantity of first model parameters whose transmission stops to the quantity of third model parameters needs to be calculated. If the proportion is greater than the preset proportion, the preset threshold is decreased.

After operation 6 is completed, go back to operation 5. To be specific, after transmission automatically starts after the preset time period arrives, whether the first model parameter value is stable continues to be determined. In other words, the entire model training process is a process in which a model parameter value and an update amount of the value is cyclically exchanged between the communication device and the central server. In the model training process, stability of a model parameter needs to be repeatedly determined based on the detection period, and corresponding duration is obtained.

For example, the communication device determines the change amount of the first model parameter value M times, where M is a positive integer greater than or equal to 2. That the communication device determines, based on a stable status of the first model parameter at the $k^{th}$ time, a preset condition met by the preset time period includes: If it is determined, at the $k^{th}$ time based on the change amount of the first model parameter value, that the first model parameter is stable, duration of the preset time period is first duration, where the first duration is greater than second duration. The second duration is duration of a preset time period in which the communication device stops sending the update amount of the first model parameter value to the central server when determining at the $(k-1)^{th}$ time that the first model parameter is stable; or the second duration is duration that is obtained when it is determined at the $(k-1)^{th}$ time that the first model parameter is unstable, and that is used to adjust duration of a corresponding preset time period when the first model parameter is stable next time, where k is a positive integer, and k≤M.

Step 7: Continue to transmit the update amount of the first model parameter value, and obtain duration less than the duration obtained last time.

For example, because the first model parameter is unstable this time, duration used to adjust duration obtained in next detection needs to be obtained, and the duration obtained this time needs to be less than the duration obtained in last detection. The first model parameter value may be stable or unstable in last detection.

After operation 7 is completed, go back to operation 5. To be specific, whether the first model parameter value is stable continues to be determined in a next detection period.

For example, the communication device determines the change amount of the first model parameter value M times, where M is a positive integer greater than or equal to 2. That the communication device determines, based on a stable status of the first model parameter at the $k^{th}$ time, the preset condition met by the preset time period further includes: If it is determined at the $k^{th}$ time that the first model parameter is unstable, third duration used to adjust duration of a corresponding preset time period when the first model parameter is stable next time is obtained, where the third duration is less than fourth duration. The fourth duration is duration of a preset time period in which the communication device stops sending the update amount of the first model parameter value to the central server when determining at the $(k-1)^{th}$ time that the first model parameter is stable; or the fourth duration is duration that is obtained when it is determined at the $(k-1)^{th}$ time that the first model parameter is unstable, and that is used to adjust duration of a corresponding preset time period when the first model parameter is stable next time.

Step 8: Continue to transmit the update amount of the first model parameter value, and obtain duration less than the initial duration.

For example, if the first model parameter is unstable, transmission continues, and duration used to adjust duration obtained in next detection may be obtained this time, where the current duration is less than the initial duration.

To be specific, in a process of transmitting a model parameter value and an update amount of the value between the communication device and the central server, duration is obtained each time the change amount of the first model parameter value is determined and detected. If it is determined this time that the first model parameter is stable, it indicates that the first model parameter is converged, and duration in which transmission of the update amount of the first model parameter value stops needs to be prolonged. In this case, obtained duration is duration of the preset time period, and the duration is greater than duration obtained in last detection. Alternatively, if it is determined this time that the first model parameter is unstable, it indicates that the first model parameter is not converged, and duration in which transmission of the update amount of the first model parameter value stops next time needs to be shortened. In this case, obtained duration is duration used to adjust duration obtained in next detection, and the duration is less than duration obtained in last detection.

In this way, the duration of the preset time period in which transmission stops may be dynamically adjusted based on a stable status of the first model parameter, to flexibly control a quantity of model parameters participating in model training that are transmitted between the communication device and the central server, thereby ensuring that precision of a finally obtained model meets a requirement.

Based on operation 1 to operation 8, for example, if the duration of the preset time period is adjusted based on duration of the sending period, when the communication device determines, at the $k^{th}$ time based on the change amount of the first model parameter value, that the first model parameter is stable, the communication device stops sending the update amount of the first model parameter value to the central server in n sending periods, where n is a positive integer.

After then sending periods, if the communication device determines, at the $(k+1)^{th}$ time based on the change amount of the first model parameter value, that the first model parameter is stable, the communication device stops sending the update amount of the first model parameter value to the central server in (n+m) sending periods, where m is a positive integer.

Alternatively, after the n sending periods, if the communication device determines, at the $(k+1)^{th}$ time based on the change amount of the first model parameter value, that the first model parameter is unstable, the communication device stops sending the update amount of the first model parameter value to the central server in (n/r+m) sending periods if the communication device determines, at the $(k+2)^{th}$ time based on the change amount, that the first model parameter is stable, where r is a positive integer greater than or equal to 2, and (n/r)≥1.

For example, it is assumed that if the first model parameter is stable at the fifth time (the $k^{th}$ time) of detection, the obtained duration of the preset time period is duration of two sending periods.

If the first model parameter is stable at the sixth time (the $(k+1)^{th}$ time) of detection after the preset time period arrives, the duration of the preset time period may be duration of 2+1=3 sending periods.

If the first model parameter is unstable at the sixth time (the $(k+1)^{th}$ time) of detection after the preset time period arrives, the obtained duration may be duration of 2/2=1 sending period. If the first model parameter is stable at the seventh time (the $(k+2)^{th}$ time) of detection, the obtained duration of the preset time period may be duration of 2/2+1=2 sending periods.

Figure 6:
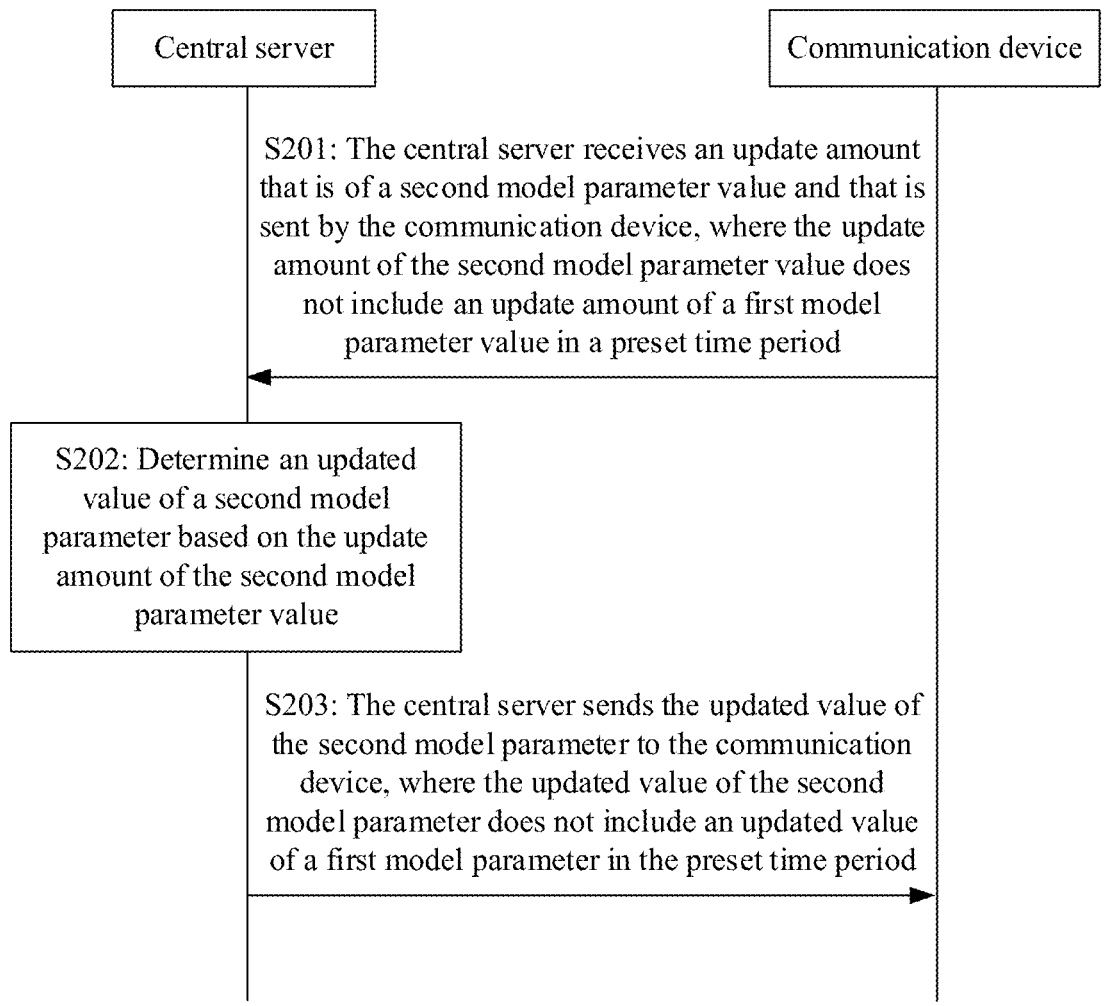
FIG. 6 is a third schematic flowchart of a model training-based communication method according to an embodiment of this application.

FIG. 6 is a schematic flowchart of another model training-based communication method according to an embodiment of this application. The method may include S201 to S203.

S201: A central server receives an update amount that is of a second model parameter value and that is sent by a communication device. In a preset time period, the update amount of the second model parameter value does not include an update amount of a first model parameter value.

A first model parameter is a stable model parameter determined based on a change amount of the first model parameter value. A process of determining that the first model parameter is stable includes: if the change amount of the first model parameter value is less than a preset threshold, determining that the first model parameter is stable. For a specific method, refer to the related description in operation S101. Details are not described herein again.

The update amount of the first model parameter value and the update amount of the second model parameter are determined by the communication device based on user data in a process of performing model training. To be specific, the communication device determines an update amount of a model parameter value based on the user data in the process of performing model training. In addition, the communication device determines, based on a stable status of a model parameter, an update amount of a value of a model parameter that needs to stop transmitting to the central server.

For example, after the preset time period, the central server sends the first model parameter value to the communication device and receives the update amount that is of the first model parameter value and that is sent by the communication device.

To be specific, the central server determines, based on the received update amount of the model parameter value, whether the communication device stops transmitting some model parameters. If the communication device stops transmitting some model parameters, the central server also stops transmitting, in the preset time period, the model parameters that the communication device stops to transmit, to implement a bidirectional decrease in an amount of transmitted data, thereby improving communication efficiency.

For remaining content, refer to the related description in operation S101 to operation S103. Details are not described herein again.

S202: The central server determines an updated value of a second model parameter based on the update amount of the second model parameter value.

For example, after receiving an update amount that is of a model parameter value and that is sent by each communication device, the central server performs superimposed averaging on the update amounts of the model parameter that are fed back by the communication devices, to obtain a unified new model parameter value. For a specific process of obtaining the new model parameter value, refer to the conventional technology. Details are not described in this embodiment of this application.

S203: The central server sends the updated value of the second model parameter to the communication device. In the preset time period, the updated value of the second model parameter does not include an updated value of the first model parameter.

For example, a model parameter value and an update amount are transmitted between the central server and the communication device by using a packet.

In a possible design of the packet, the central server sends a packet to the communication device, where the packet includes an updated value of a third model parameter and a value of a corresponding identification bit. In the preset time period, a value of an identification bit corresponding to the updated value of the first model parameter indicates that the central server does not transmit the updated value of the first model parameter to the communication device.

In another possible design of the packet, the central server sends a packet to the communication device, where the packet includes the updated value of the second model parameter and a value of a corresponding identification bit. In the preset time period, the updated value of the second model parameter does not include the updated value of the first model parameter, and the value of the identification bit corresponding to the updated value of the second model parameter indicates that the central server transmits the updated value of the second model parameter to the communication device.

For remaining content, refer to the related description in operation S101 to operation S103. Details are not described herein again.

For example, if the central server receives the update amount that is of the second model parameter value and that is sent by the communication device, the central server needs to first send a model parameter value to the communication device, so that the communication device can determine a change amount of the model parameter value based on the model parameter value, and then determine the update amount that is of the second model parameter value and that can be transmitted, and send the update amount of the second model parameter value to the central server. Therefore, before operation S201, operation S204 may be further included.

S204: The central server sends the second model parameter value to the communication device.

For example, for remaining content, refer to the related description in operation S104. Details are not described herein again.

Based on the model training-based communication provided in this application, effects of the technical solutions provided in the embodiments of this application is described below with reference to specific experimental data.

Model training methods in a distributed machine learning system that are provided in the embodiments of this application and the conventional technology are implemented on a Pytorch platform. A client in the distributed machine learning system includes 50 communication devices. Each communication device has the following configuration: m5.xlarge, two vCPUs, a memory of 8 GB, a download bandwidth of 9 Mbps, and an upload bandwidth of 3 Mbps. A server end is a central server with configuration of c5.9xlarge and a 10 Gbps bandwidth. A Pytorch platform is installed in the communication device and the central server to form a cluster, and cluster information includes an elastic compute cloud (EC2) cluster.

In the embodiments of this application, beneficial effects of the technical solutions provided in this application are mainly reflected in the following three aspects of experimental data structure analysis: overall performance, convergence, and overhead. An experimental result is mainly compared with an algorithm of a standard distributed machine learning system. A training dataset includes a small dataset CIFAR-10 and a Keyword Spotting (KWS) dataset that are used to identify a universally applicable object. A neural network model includes a LeNet, a Residual Network (ResNet) 18, and a Long Short-term Memory (LSTM) network with a two-layer loop (recurrent layer). The LeNet and the ResNet 18 train the neural network model by using the dataset CIFAR-10. The LSTM with a two-layer loop (recurrent layer) uses the dataset KWS to train the neural network model.

In a first aspect, overall performance is compared.

In a process of training the three neural network models, a total amount of data transmitted between the communication device and the central server and average time in each transmission that are obtained by using the model training-based communication method provided in the embodiments of this application are compared with those obtained by using the model training-based communication method in the conventional technology.

The following Table 1 shows comparison between the total amounts of transmitted data.

TABLE 1

| Model | LeNet | ResNet 18 | KWS-LSTM |
|---|---|---|---|
| This application | 239 MB | 2.62 G | 194 MB |
| Conventional technology | 651 MB | 3.12 G | 428 MB |
| Improved proportion | 63.29% | 16.02% | 54.35% |

The following Table 2 shows comparison between average training time.

TABLE 2

| Model | LeNet | ResNet 18 | KWS-LSTM |
|---|---|---|---|
| This application | 0.74 ms | 139 s | 1.8 s |
| Conventional technology | 1.02 s | 158 s | 2.2 s |
| Improved proportion | 27.45% | 12.03% | 18.18% |

In this way, it may be learned from the experimental data in Table 1 and Table 2 that in the technical solutions provided in the embodiments of this application, a data amount of a model parameter transmitted between the communication device and the central server can be effectively decreased in a process of training the neural network model, and time overhead for transmitting the model parameter.

In a second aspect, convergence is analyzed.

Figure 7:
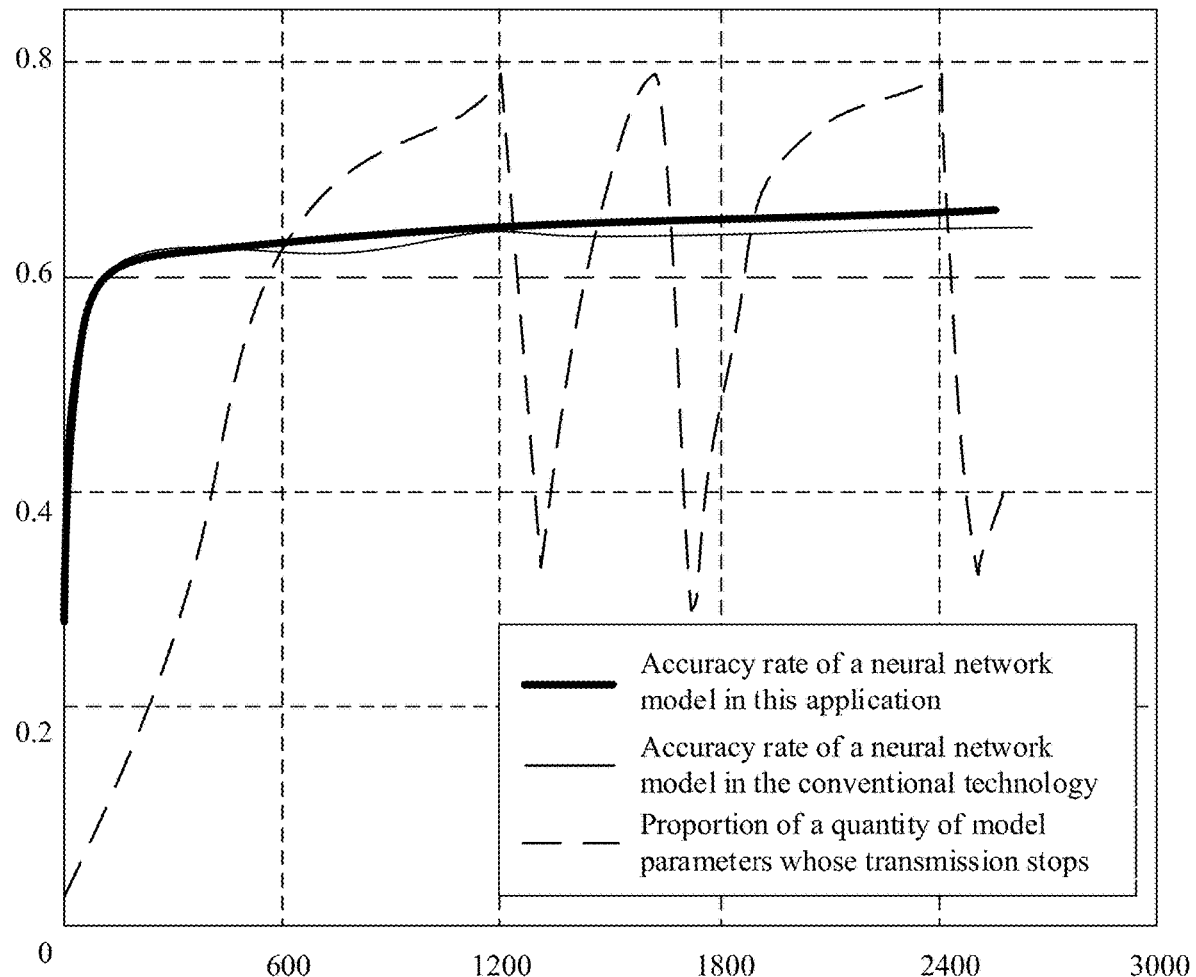
FIG. 7 is a first experimental data result analysis diagram according to an embodiment of this application.
Figure 8:
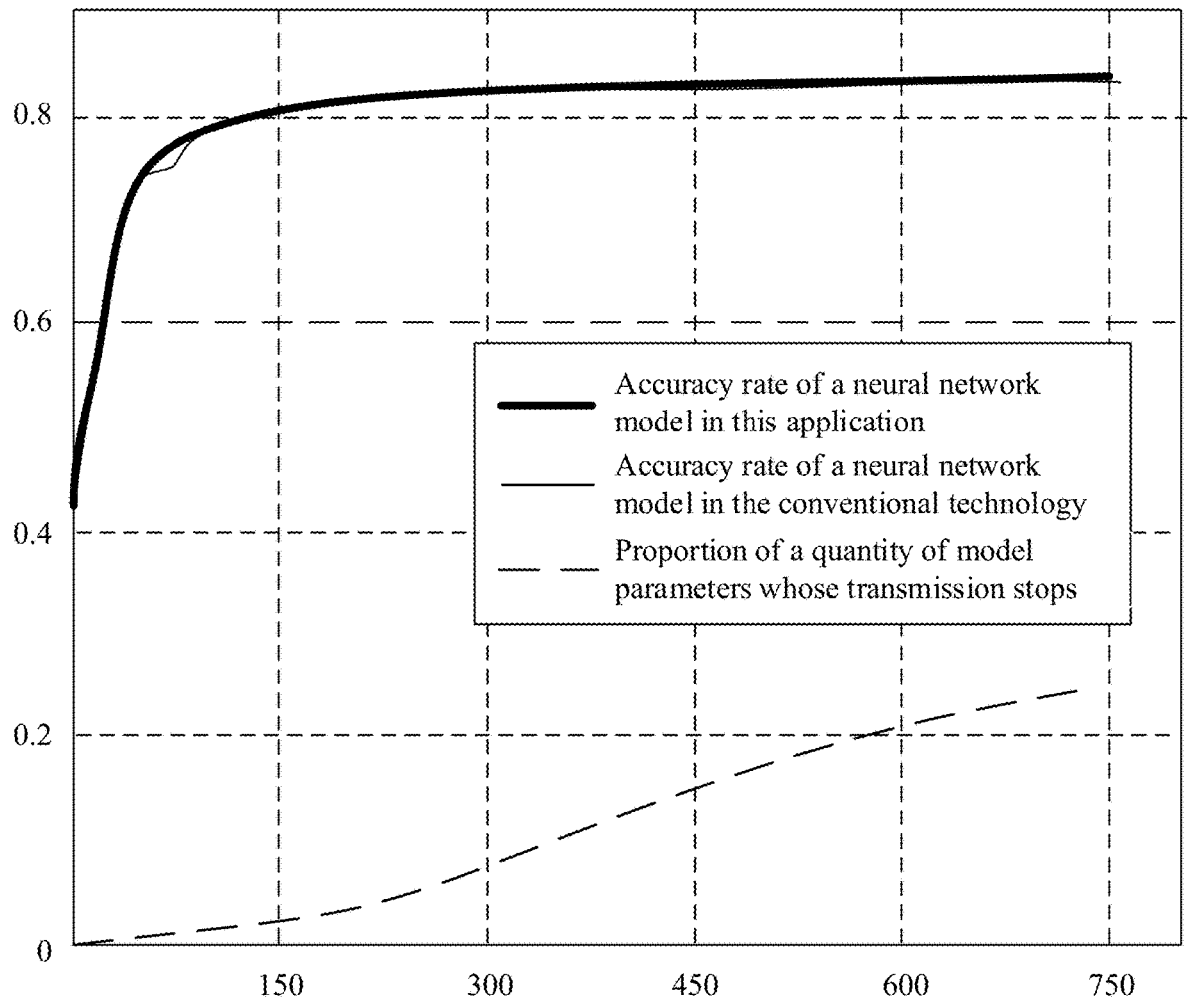
FIG. 8 is a second experimental data result analysis diagram according to an embodiment of this application.
Figure 9:
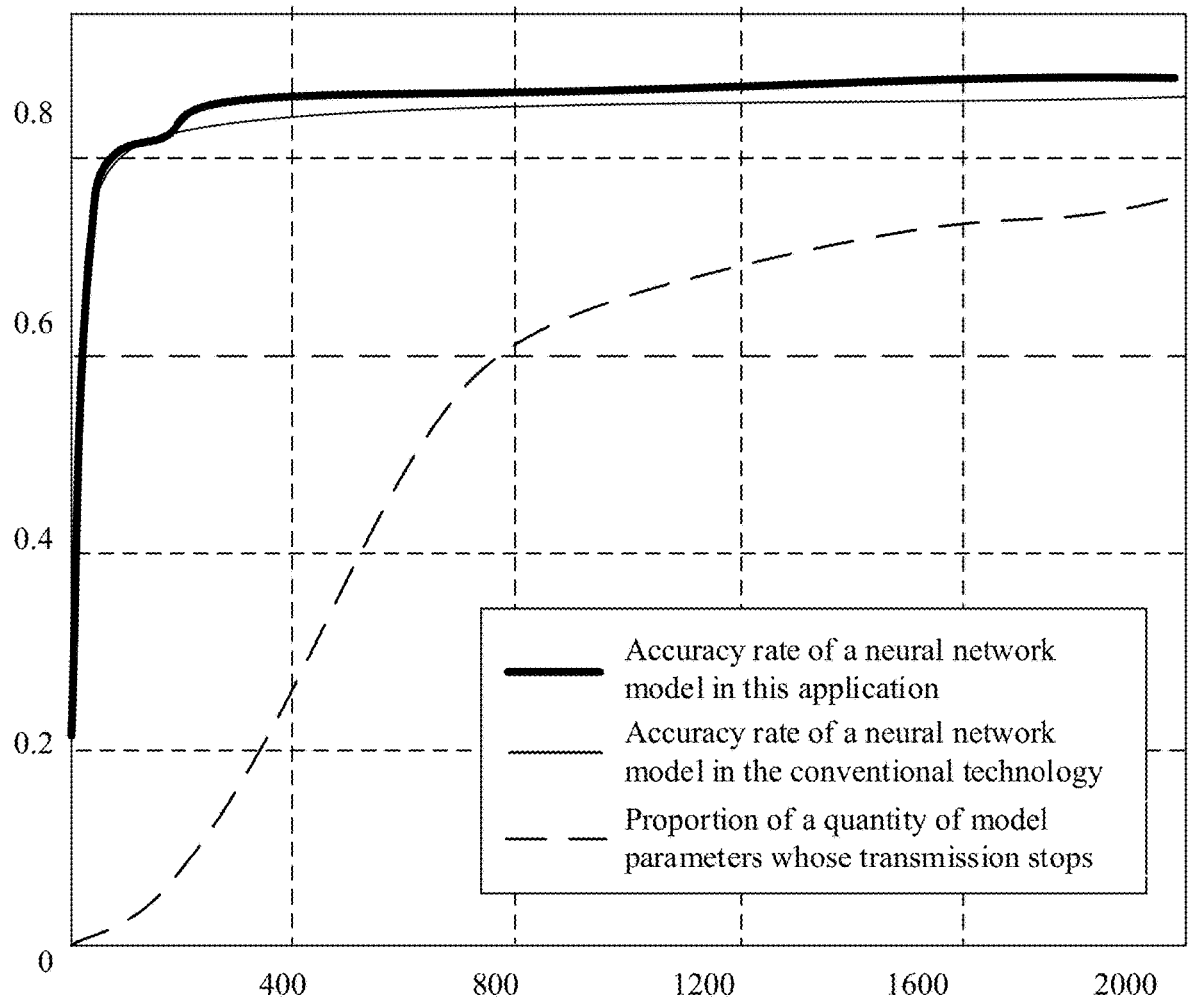
FIG. 9 is a third experimental data result analysis diagram according to an embodiment of this application.

Accuracy rates of the three types of neural network models and a proportion of a quantity of model parameters whose transmission stops are analyzed, to obtain an experimental data result analysis diagram of the LeNet shown in FIG. 7, an experimental data result analysis diagram of the ResNet 18 shown in FIG. 8, and an experimental data result analysis diagram of the KWS-LSTM shown in FIG. 9.

In FIG. 7, FIG. 8, and FIG. 9, a horizontal coordinate indicates a communication round of transmission between the communication device and the central server, and a vertical coordinate indicates an accuracy rate of a neural network model or a proportion of a quantity of model parameters whose transmission stops. A thick solid line indicates an accuracy rate of a neural network model obtained by using the technical solutions in this application. A thin solid line indicates an accuracy rate of a neural network model obtained by using the technical solutions in the conventional technology. A dashed line indicates a proportion of a quantity of model parameters whose transmission stops to a quantity of all model parameters in a model training process after the technical solutions in the embodiments of this application are used.

It may be learned that in the technical solutions provided in the embodiments of this application, after transmission of some model parameters stops, model convergence can still be implemented after a limited quantity of communication rounds, and precision (the accuracy rate) is stable. In addition, precision of the neural network model is not reduced.

In a third aspect, overhead is compared.

The overhead includes time overhead and memory overhead that are obtained after the three types of neural network models use the technical solutions provided in the embodiments of this application to perform model training-based communication, and a time overhead proportion and a memory overhead proportion that are increased relative to the model training-based communication method in the conventional technology.

TABLE 3

| Model | LeNet | ResNet 18 | KWS-LSTM |
|---|---|---|---|
| Time overhead | 0.009 s | 1.278 s | 0.011 s |
| Increased time overhead proportion | 1.93% | 4.50% | 1.42% |
| Memory overhead | 1.2 M | 142 MB | 4.8 MB |
| Increased memory overhead proportion | 0.18% | 8.51% | 2.35% |

It may be learned from the experimental data in the Table 3 that in the technical solutions provided in the embodiments of this application, increased proportions of the time overhead and the memory overhead are relatively small, which do not have an excessively large impact on a model training process.

In conclusion, compared with the algorithm of the standard distributed machine learning system in the conventional technology, using the technical solutions provided in the embodiments of this application can effectively decrease a total amount of transmitted data and average time of each transmission in terms of overall performance. In addition, precision of the neural network model and overhead generated in a training process are not greatly affected.

Figure 10:
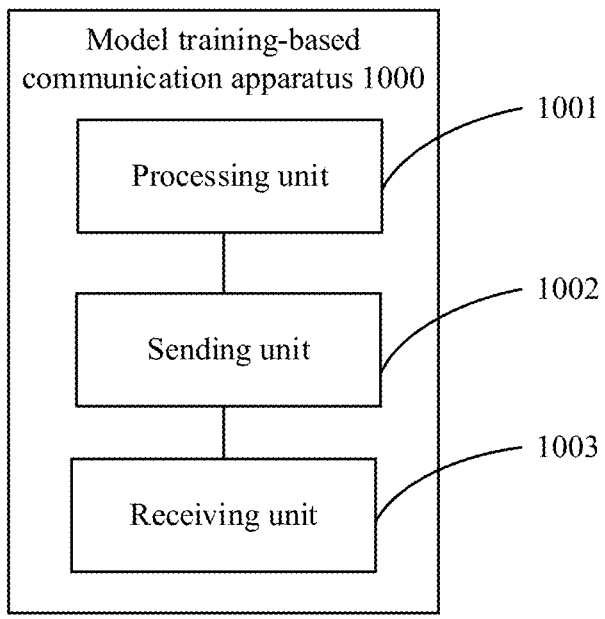
FIG. 10 is a first schematic diagram of a structure of a model training-based communication apparatus according to an embodiment of this application.

FIG. 10 is a possible schematic diagram of a structure of a model training-based communication apparatus in the foregoing embodiments. As shown in FIG. 10, the model training-based communication apparatus 1000 includes a processing unit 1001, a sending unit 1002, and a receiving unit 1003.

The processing unit 1001 is configured to support the model training-based communication apparatus 1000 in performing operations S101 and S102 in FIG. 3 and/or another process of the technology described in this specification.

The sending unit 1002 is configured to support the model training-based communication apparatus 1000 in performing operation S102 in FIG. 3 and/or another process of the technology described in this specification.

The receiving unit 1003 is configured to support the model training-based communication apparatus 1000 in performing operation S103 in FIG. 3 and/or another process of the technology described in this specification.

All related content of the operations in the foregoing method embodiments may be cited in function descriptions of corresponding functional units. Details are not described herein again.

Figure 11:
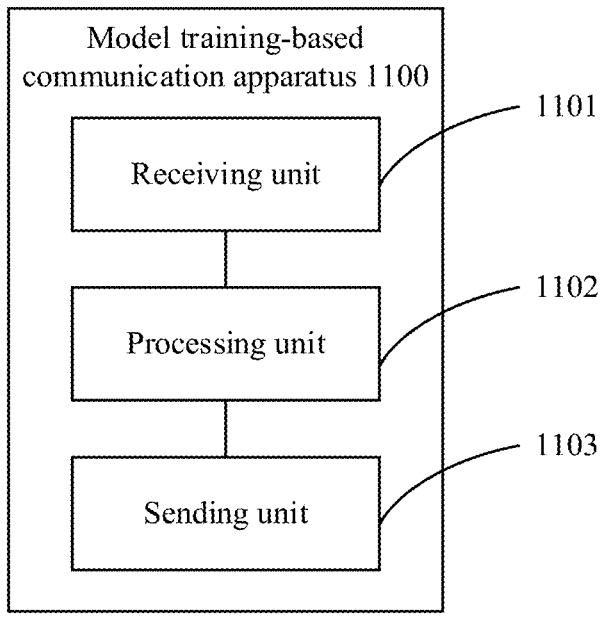
FIG. 11 is a second schematic diagram of a structure of a model training-based communication apparatus according to an embodiment of this application.

FIG. 11 is a possible schematic diagram of a structure of a model training-based communication apparatus in the foregoing embodiments. As shown in FIG. 11, the model training-based communication apparatus 1100 includes a receiving unit 1101, a processing unit 1102, and a sending unit 1103.

The receiving unit 1101 is configured to support the model training-based communication apparatus 1100 in performing operation S201 in FIG. 6 and/or another process of the technology described in this specification.

The processing unit 1102 is configured to support the model training-based communication apparatus 1100 in performing operation S202 in FIG. 6 and/or another process of the technology described in this specification.

The sending unit 1103 is configured to support the model training-based communication apparatus 1100 in performing operation S203 in FIG. 6 and/or another process of the technology described in this specification.

All related content of the operations in the foregoing method embodiments may be cited in function descriptions of corresponding functional units. Details are not described herein again.

Figure 12:
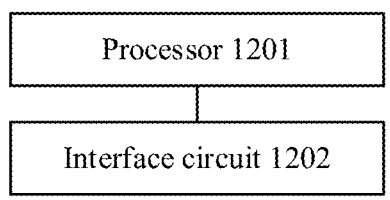
FIG. 12 is a schematic diagram of a structure of a chip system according to an embodiment of this application.

An embodiment of this application further provides a chip system. As shown in FIG. 12, the chip system includes at least one processor 1201 and at least one interface circuit 1202. The processor 1201 and the interface circuit 1202 may be interconnected through a line. For example, the interface circuit 1202 may be configured to receive a signal from another apparatus. For another example, the interface circuit 1202 may be configured to send a signal to another apparatus (for example, the processor 1201). For example, the interface circuit 1202 may read instructions stored in a memory, and send the instructions to the processor 1201. When the instructions are executed by the processor 1201, the model training-based communication apparatus may be enabled to perform the operations in the model training-based communication method in the foregoing embodiments. Certainly, the chip system may further include another discrete component. This is not limited in this embodiment of this application.

An embodiment of this application further provides a computer storage medium. The computer storage medium stores computer instructions. When the computer instructions are run on a model training-based communication apparatus, the model training-based communication apparatus is enabled to perform the foregoing related method operations to implement the model training-based communication method in the foregoing embodiments.

An embodiment of this application further provides a computer program product. When the computer program product runs on a computer, the computer is enabled to perform the foregoing related operations to implement the model training-based communication method in the foregoing embodiments.

In addition, an embodiment of this application further provides an apparatus. The apparatus may be a component or a module. The apparatus may include a processor and a memory that are connected to each other. The memory is configured to store computer-executable instructions. When the apparatus runs, the processor may execute the computer-executable instructions stored in the memory, so that the apparatus is enabled to perform the model training-based communication method in the foregoing method embodiments.

The apparatus, the computer storage medium, the computer program product, and the chip provided in embodiments of this application are all configured to perform the corresponding method provided above. Therefore, for beneficial effects that can be achieved by the apparatus, the computer storage medium, the computer program product, and the chip, refer to beneficial effects of the corresponding method provided above. Details are not described herein again.

Based on the foregoing descriptions of the embodiments, a person skilled in the art may clearly understand that for the purpose of convenient and brief descriptions, division into the foregoing functional modules is merely used as an example for descriptions. During an actual application, the foregoing functions can be allocated to different functional modules for embodiments based on a requirement, in other words, an inner structure of an apparatus is divided into different functional modules to implement all or a part of the functions described above. For a specific working process of the foregoing system, apparatus, and unit, refer to a corresponding process in the foregoing method embodiments, and details are not described herein again.

In the several embodiments provided in this application, it should be understood that the disclosed methods may be implemented in other manners. For example, the foregoing described apparatus embodiments are merely examples. For example, division into the modules or units is merely logical function division and may be other division during an actual implementation of any of the embodiments. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) to a processor perform all or some of the operations of the methods described in embodiments of this application. The foregoing storage medium includes any medium that can store program instructions, for example, a flash memory, a removable hard disk, a read-only memory, a random access memory, a magnetic disk, or an optical disc.

The foregoing descriptions are only embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A model training-based communication method, applied to a system comprising a central server and a communication device, wherein the method comprises:
   determining, by the communication device, a change amount of a first model parameter value;
   in response to determining that a first model parameter is stable, stopping sending, by the communication device, an update amount of the first model parameter value to the central server in a preset time period, wherein the update amount of the first model parameter value is determined by the communication device based on user data in a process of performing model training; and
   receiving, by the communication device, a second model parameter value sent by the central server, wherein in the preset time period, the second model parameter value does not comprise the first model parameter value.

2. The method according to claim 1, wherein the method further comprises:
   after the preset time period, sending, by the communication device, the update amount of the first model parameter value to the central server, and receiving the first model parameter value sent by the central server.

3. The method according to claim 1, wherein the stopping of the sending, by the communication device, the update amount of the first model parameter value to the central server in the preset time period further comprises:
   sending, by the communication device, a packet to the central server, wherein the packet comprises an update amount of a third model parameter value and a value of a corresponding identification bit, wherein the update amount of the third model parameter value comprises an update amount of the second model parameter value and the update amount of the first model parameter value, and wherein in the preset time period, a value of an identification bit corresponding to the update amount of the first model parameter value indicates that the communication device does not transmit the update amount of the first model parameter value to the central server; or
   sending, by the communication device, a packet to the central server, wherein the packet comprises an update amount of the second model parameter value and a value of a corresponding identification bit; and
   wherein in the preset time period, the update amount of the second model parameter value does not comprise the update amount of the first model parameter value, and the value of the identification bit corresponding to the second model parameter value indicates that the communication device transmits the update amount of the second model parameter value to the central server.

4. The method according to claim 1, wherein the determining, by the communication device, the change amount of a first model parameter value comprises:
   obtaining, by the communication device, the change amount of the first model parameter value based on historical information of the first model parameter value.

5. The method according to claim 4, wherein the historical information of the first model parameter value comprises an effective change amount of the first model parameter value and an accumulated change amount of the first model parameter value.

6. The method according to claim 1, wherein the determining, by the communication device, the change amount of the first model parameter value comprises:

determining, by the communication device, the change amount of the first model parameter value M times, wherein M is a positive integer greater than or equal to 2; and determining, by the communication device, based on a stable status of the first model parameter at a $k^{th}$ time, a preset condition met by the preset time period, wherein the determining of the preset condition by the preset time period further comprises:

when it is determined, at the $k^{th}$ time based on the change amount of the first model parameter value, that the first model parameter is stable, a duration of the preset time period is a first duration, wherein the first duration is greater than second duration; and wherein the second duration is a duration of the preset time period in which the communication device stops sending the update amount of the first model parameter value to the central server when determining at the $(k-1)^{th}$ time that the first model parameter is stable, or the second duration is a duration that is obtained when it is determined at the $(k-1)^{th}$ time that the first model parameter is unstable and that is used to adjust a duration of a corresponding preset time period when the first model parameter is stable next time, wherein k is a positive integer, and k≤M.

7. The method according to claim 6, wherein the preset condition further comprises:

when it is determined at the $k^{th}$ time that the first model parameter is unstable, a third duration used to adjust a duration of a corresponding preset time period when the first model parameter is stable a next time is obtained, wherein the third duration is less than fourth duration; and wherein the fourth duration is a duration of a preset time period in which the communication device stops sending the update amount of the first model parameter value to the central server when determining at the $(k-1)^{th}$ time that the first model parameter is stable, or the fourth duration is a duration that is obtained when it is determined at the $(k-1)^{th}$ time that the first model parameter is unstable and that is used to adjust the duration of the corresponding preset time period when the first model parameter is stable the next time.

8. The method according to claim 6, wherein the stopping of the sending, by the communication device, the update amount of the first model parameter value to the central server in a preset time period comprises:

when the communication device determines, at the $k^{th}$ time based on the change amount of the first model parameter value, that the first model parameter is stable, stopping sending, by the communication device, the update amount of the first model parameter value to the central server in n sending periods, wherein n is a positive integer;

after the n sending periods, when the communication device determines, at the $(k+1)^{th}$ time based on the change amount of the first model parameter value, that the first model parameter is stable, stopping sending, by the communication device, the update amount of the first model parameter value to the central server in (n+m) sending periods, wherein m is a positive integer; and after the n sending periods, when the communication device determines, at the $(k+1)^{th}$ time based on the change amount of the first model parameter value, that the first model parameter is unstable, stopping sending, by the communication device, the update amount of the first model parameter value to the central server in (n/r+m) sending periods when the communication device determines, at the $(k+2)^{th}$ time based on the change amount, that the first model parameter is stable, wherein r is a positive integer greater than or equal to 2, (n/r)≥1, and wherein the sending period is a period in which the communication device sends an update amount of a model parameter value to the central server.

9. The method according to claim 1, wherein before the determining, by the communication device, the change amount of the first model parameter value, the method further comprises:

receiving, by the communication device, the second model parameter value sent by the central server.

10. A model training-based communication method, applied to a system comprising a central server and a communication device, wherein the method comprises:

receiving, by the central server, an update amount that is of a second model parameter value and that is sent by the communication device, wherein in a preset time period, the update amount of the second model parameter value does not comprise an update amount of a first model parameter value, and wherein a first model parameter is a stable model parameter determined based on a change amount of the first model parameter value;

determining, by the central server, an updated value of a second model parameter based on the update amount of the second model parameter value; and sending, by the central server, the updated value of the second model parameter to the communication device, wherein in the preset time period, the updated value of the second model parameter does not comprise an updated value of the first model parameter.

11. The method according to claim 10, wherein the method further comprises:

after the preset time period, sending, by the central server, the first model parameter value to the communication device and receiving the update amount that is of the first model parameter value and that is sent by the communication device.

12. The method according to claim 10, wherein the sending, by the central server, the updated value of the second model parameter to the communication device comprises:

sending, by the central server, a packet to the communication device, wherein the packet comprises an updated value of a third model parameter and a value of a corresponding identification bit, wherein the updated value of the third model parameter comprises the updated value of the second model parameter and the updated value of the first model parameter, wherein in the preset time period, a value of an identification bit corresponding to the updated value of the first model parameter indicates that the central server does not transmit the updated value of the first model parameter to the communication device; or sending, by the central server, a packet to the communication device, wherein the packet comprises the updated value of the second model parameter and a value of a corresponding identification bit, and wherein in the preset time period, the updated value of the second model parameter does not comprise the updated value of the first model parameter, and the value of the identification bit corresponding to the second model parameter indicates that the central server transmits the updated value of the second model parameter to the communication device.

13. A non-transitory computer-readable storage medium storing computer instructions, when executed by a processor of a communication device, cause the communication device to perform operations comprising:
   determining a change amount of a first model parameter value;
   in response to determining, based on the change amount of the first model parameter value, that a first model parameter is stable, stopping sending an update amount of the first model parameter value to a central server in a preset time period, wherein the update amount of the first model parameter value is determined by the communication device based on user data in a process of performing model training; and
   receiving a second model parameter value sent by the central server, wherein in the preset time period, the second model parameter value does not comprise the first model parameter value.

14. The non-transitory computer-readable storage medium according to claim 13, wherein the operations further comprises:
   after the preset time period, sending the update amount of the first model parameter value to the central server, and receiving the first model parameter value sent by the central server.

15. The non-transitory computer-readable storage medium according to claim 13, wherein the stopping of the sending the update amount of the first model parameter value to the central server in the preset time period comprises:
   sending a packet to the central server, wherein the packet comprises an update amount of a third model parameter value and a value of a corresponding identification bit, wherein the update amount of the third model parameter value comprises an update amount of the second model parameter value and the update amount of the first model parameter value, and wherein in the preset time period, a value of an identification bit corresponding to the update amount of the first model parameter value indicates that the communication device does not transmit the update amount of the first model parameter value to the central server; or
   sending a packet to the central server, wherein the packet comprises an update amount of the second model parameter value and a value of a corresponding identification bit, and wherein in the preset time period, the update amount of the second model parameter value does not comprise the update amount of the first model parameter value, and the value of the identification bit corresponding to the second model parameter value indicates that the communication device transmits the update amount of the second model parameter value to the central server.

16. The non-transitory computer-readable storage medium according to claim 13, wherein the determining the change amount of the first model parameter value comprises:
   obtaining the change amount of the first model parameter value based on historical information of the first model parameter value.

17. The non-transitory computer-readable storage medium according to claim 16, wherein the historical information of the first model parameter value comprises an effective change amount of the first model parameter value and an accumulated change amount of the first model parameter value.

18. The non-transitory computer-readable storage medium according to claim 13, wherein the determining the change amount of the first model parameter value comprises:
   determining the change amount of the first model parameter value M times, wherein M is a positive integer greater than or equal to 2; and
   determining, based on a stable status of the first model parameter at a $k^{th}$ time, a preset condition met by the preset time period, wherein the determining of the preset condition further comprises:
   when it is determined, at the $k^{th}$ time based on the change amount of the first model parameter value, that the first model parameter is stable, a duration of the preset time period is first duration, wherein the first duration is greater than a second duration; and
   wherein the second duration is a duration of a preset time period in which the communication device stops sending the update amount of the first model parameter value to the central server when determining at the $(k-1)^{th}$ time that the first model parameter is stable, or the second duration is a duration that is obtained when it is determined at the $(k-1)^{th}$ time that the first model parameter is unstable and that is used to adjust duration of a corresponding preset time period when the first model parameter is stable next time, wherein k is a positive integer, and k≤M.

19. The non-transitory computer-readable storage medium according to claim 18, wherein the preset condition further comprises:
   when it is determined at the $k^{th}$ time that the first model parameter is unstable, a third duration used to adjust duration of a corresponding preset time period when the first model parameter is stable a next time is obtained, wherein the third duration is less than fourth duration; and
   wherein the fourth duration is a duration of a preset time period in which the communication device stops sending the update amount of the first model parameter value to the central server when determining at the $(k-1)^{th}$ time that the first model parameter is stable, or the fourth duration is a duration that is obtained when it is determined at the $(k-1)^{th}$ time that the first model parameter is unstable and that is used to adjust the duration of the corresponding preset time period when the first model parameter is stable the next time.

20. The non-transitory computer-readable storage medium according to claim 18, the stopping of the sending the update amount of the first model parameter value to the central server in a preset time period comprises:
   when determining, at the $k^{th}$ time based on the change amount of the first model parameter value, that the first model parameter is stable, stopping sending the update amount of the first model parameter value to the central server in n sending periods, wherein n is a positive integer;
   after the n sending periods, when determining, at the $(k+1)^{th}$ time based on the change amount of the first model parameter value, that the first model parameter is stable, stopping sending the update amount of the first model parameter value to the central server in (n+m) sending periods, wherein m is a positive integer; and after the n sending periods, when determining, at the $(k+1)^{th}$ time based on the change amount of the first model parameter value, that the first model parameter is unstable, stopping sending, by the communication device, the update amount of the first model parameter value to the central server in (n/r+m) sending periods when the communication device determines, at the $(k+2)^{th}$ time based on the change amount, that the first model parameter is stable, wherein r is a positive integer greater than or equal to 2, (n/r)≥1, and wherein the sending period is a period in which the communication device sends an update amount of a model parameter value to the central server.

* * * * *